United States Patent
Shirai et al.

(10) Patent No.: US 10,484,551 B2
(45) Date of Patent: Nov. 19, 2019

(54) INFORMATION PROCESSING APPARATUS CONFIGURED TO DETECT SETTINGS IN A CONFLICTING RELATION, INFORMATION PROCESSING METHOD, AND INFORMATION PROCESSING SYSTEM

(71) Applicants: Tatsuya Shirai, Kanagawa (JP); Minami Ogawa, Tokyo (JP)

(72) Inventors: Tatsuya Shirai, Kanagawa (JP); Minami Ogawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 72 days.

(21) Appl. No.: 15/069,466

(22) Filed: Mar. 14, 2016

(65) Prior Publication Data
US 2016/0277608 A1   Sep. 22, 2016

(30) Foreign Application Priority Data

Mar. 18, 2015 (JP) ................................. 2015-055383
Mar. 20, 2015 (JP) ................................. 2015-058402
Mar. 11, 2016 (JP) ................................. 2016-048497

(51) Int. Cl.
*G06F 3/12* (2006.01)
*H04N 1/00* (2006.01)

(52) U.S. Cl.
CPC ....... *H04N 1/00464* (2013.01); *G06F 3/1201* (2013.01); *G06F 3/1246* (2013.01);
(Continued)

(58) Field of Classification Search
CPC ........... H04N 1/00464; H04N 1/00411; H04N 2201/0094; G06F 3/1254; G06F 3/1255;
(Continued)

(56) References Cited

U.S. PATENT DOCUMENTS 7,328,224 B2 * 2/2008 Kawamoto ........... G06F 3/1284
                                                           358/1.14
7,847,968 B2   12/2010 Abiko
(Continued)

FOREIGN PATENT DOCUMENTS

JP   2005-267088    9/2005
JP   2007-102725 A  4/2007
(Continued)

OTHER PUBLICATIONS

Japanese Office Action dated Jul. 2, 2019 for corresponding Japanese Application No. 2016048497.

*Primary Examiner* — Benny Q Tieu
*Assistant Examiner* — Juan M Guillermety
(74) *Attorney, Agent, or Firm* — Harness, Dickey & Pierce, P.L.C.

(57) ABSTRACT

A communication unit obtains, from a server apparatus, a screen to be displayed on an operation display unit and one or more scripts. A first obtaining unit obtains first setting information stored in a storage unit. A second obtaining unit obtains, from a Web application, second setting information prescribing therein setting conditions set on the Web application that transmits a processing request to an information processing apparatus. A third obtaining unit obtains conflict information stored in the storage unit. A detecting unit detects, based on the conflict information obtained by the third obtaining unit, any setting conditions in a conflicting relation, from the setting conditions prescribed in the second setting information. The first obtaining unit, the second obtaining unit, the third obtaining unit, and the detecting unit function when a processor executes the obtained one or more scripts on a browser.

10 Claims, 19 Drawing Sheets

(52) U.S. Cl.
CPC .......... *G06F 3/1254* (2013.01); *G06F 3/1255* (2013.01); *H04N 1/00411* (2013.01); *H04N 2201/0094* (2013.01)

(58) Field of Classification Search
CPC .... G06F 3/1201; G06F 3/1246; G06F 3/1256; G06F 3/1285; G06F 9/44552
See application file for complete search history.

(56) References Cited

U.S. PATENT DOCUMENTS

| | | | |
|---|---|---|---|
| 8,065,507 B2 | 11/2011 | Asano | |
| 8,451,496 B2 | 5/2013 | Ohashi | |
| 8,813,021 B1* | 8/2014 | Ogami | G06F 3/048 |
| | | | 714/38.1 |
| 8,817,281 B2 | 8/2014 | Natori | |
| 9,213,508 B2* | 12/2015 | Sueshige | G06F 3/1255 |
| 9,609,152 B2* | 3/2017 | Suwabe | H04N 1/00464 |
| 2007/0081180 A1 | 4/2007 | Abiko | |
| 2008/0144087 A1* | 6/2008 | Mitsui | G06F 3/1204 |
| | | | 358/1.15 |
| 2008/0235789 A1* | 9/2008 | Erwin | G06F 17/30873 |
| | | | 726/19 |
| 2009/0251713 A1* | 10/2009 | Funane | G06F 3/1254 |
| | | | 358/1.9 |
| 2009/0271696 A1* | 10/2009 | Bailor | G06F 17/30873 |
| | | | 715/229 |
| 2011/0032569 A1 | 2/2011 | Ohashi | |
| 2011/0134475 A1* | 6/2011 | Ooba | H04N 1/00464 |
| | | | 358/1.15 |
| 2011/0239060 A1* | 9/2011 | Okada | H04N 1/00464 |
| | | | 714/57 |
| 2012/0110433 A1* | 5/2012 | Pan | G06F 17/211 |
| | | | 715/234 |
| 2012/0120437 A1* | 5/2012 | Nanaumi | G06F 3/1255 |
| | | | 358/1.15 |
| 2012/0194844 A1 | 8/2012 | Natori | |
| 2013/0263046 A1* | 10/2013 | Takahashi | H04N 1/00482 |
| | | | 715/788 |
| 2014/0198343 A1* | 7/2014 | Cho | G06F 3/1255 |
| | | | 358/1.15 |
| 2015/0002888 A1* | 1/2015 | Tsujimoto | H04N 1/00464 |
| | | | 358/1.14 |
| 2015/0268948 A1* | 9/2015 | Plate | G06F 9/44552 |
| | | | 717/123 |
| 2015/0281500 A1* | 10/2015 | Mori | H04N 1/00244 |
| | | | 358/1.15 |
| 2015/0309848 A1* | 10/2015 | Sundstrom | G06F 9/3009 |
| | | | 714/15 |
| 2015/0370650 A1* | 12/2015 | Tajima | G06F 17/30864 |
| | | | 707/647 |

FOREIGN PATENT DOCUMENTS

| | | |
|---|---|---|
| JP | 2008-015695 | 1/2008 |
| JP | 2009-015798 | 1/2009 |
| JP | 2010-191543 | 9/2010 |
| JP | 2010-218314 | 9/2010 |
| JP | 2011-039628 A | 2/2011 |
| JP | 2012-160009 A | 8/2012 |
| JP | 2015-201167 | 11/2015 |

* cited by examiner

FIG.4

| SETTING CONDITION | | |
|---|---|---|
| SETTING ITEM | INITIAL SETTING VALUE | LIST OF SETTING VALUES |
| printColor | GRAY | BLACK AND WHITE, GRAY, COLOR |
| punch | TWO UPPER PUNCH HOLES | NONE, TWO UPPER PUNCH HOLES, TWO LEFT PUNCH HOLES |
| printSide | | |
| paperTray | | |
| copiesRange | 1 | |

FIG.5

| SETTING ITEM | FINALIZED SETTING VALUE | INITIAL SETTING VALUE | USABILITY IN DEVICE | USABILITY OF EACH LISTED SETTING VALUE | CONSTRAINT INFORMATION | | |
|---|---|---|---|---|---|---|---|
| | | | | | MAXIMUM NUMBER OF CHARACTERS | MAXIMUM VALUE | MINIMUM VALUE |
| printColor | GRAY | GRAY | USABLE | BLACK AND WHITE: USABLE GRAY: USABLE COLOR: UNUSABLE | | | |
| punch | | | UNUSABLE | NONE: UNUSABLE TWO UPPER PUNCH HOLES: UNUSABLE TWO RIGHT PUNCH HOLES: UNUSABLE | | | |
| printSide | ONE SIDED | ONE SIDED | USABLE | ONE SIDED: USABLE TWO SIDED AND OPEN TO LEFT AND RIGHT: USABLE MAGAZINE BINDING: USABLE | | | |
| paperTray | AUTOMATIC | AUTOMATIC | USABLE | AUTOMATIC SETTING: USABLE TRAY 1: USABLE TRAY 2: USABLE | | | |
| copiesRange | 1 | 1 | USABLE | | | 1 | 999 |

| CLASSIFICATION | PROCESSING CONTENT |
|---|---|
| STATE OUTPUTTING SCRIPT | OUTPUT STATE INFORMATION |
| REQUEST TRANSMITTING SCRIPT | TRANSMIT REQUEST SIGNAL |
| DEVICE STATE MONITORING SCRIPT | PERFORM MONITORING OF STATE OF DEVICE |
| PROCESSING STATE MONITORING SCRIPT | PERFORM MONITORING OF STATE OF PROCESSING BEING EXECUTED |

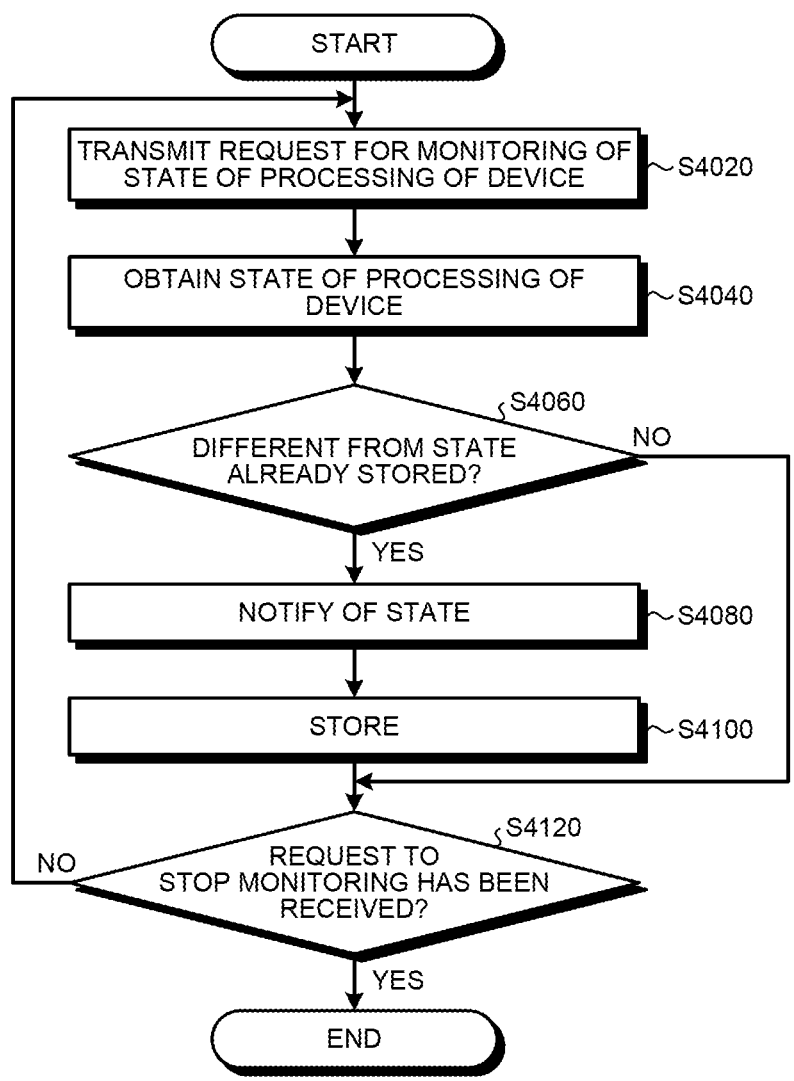

INFORMATION PROCESSING APPARATUS CONFIGURED TO DETECT SETTINGS IN A CONFLICTING RELATION, INFORMATION PROCESSING METHOD, AND INFORMATION PROCESSING SYSTEM

CROSS-REFERENCE TO RELATED APPLICATIONS

The present application claims priority to and incorporates by reference the entire contents of Japanese Patent Application No. 2015-055383 filed in Japan on Mar. 18, 2015, Japanese Patent Application No. 2015-058402 filed in Japan on Mar. 20, 2015 and Japanese Patent Application No. 2016-048497 filed in Japan on Mar. 11, 2016.

BACKGROUND OF THE INVENTION

1. Field of the Invention

The present invention relates to an information processing apparatus, an information processing method, and an information processing system.

2. Description of the Related Art

Devices, such as multifunction peripherals, are known, which are able to be operated from browsers for browsing web pages. Such a device has an application programming interface (API) for controlling functions of a scanner, a printer, or the like, from a browser. Further, a technique for generating a Web page for operation, which is for operating a device, such as a scanner or a printer, by use of attribute information for each device, has been disclosed (see, for example, Japanese Patent Application Laid-open No. 2008-015695).

When plural setting conditions set on a Web application are in a conflicting relation with one another in terms of constraints at a device side, the set setting conditions may not be able to be executed at the device side. However, conventionally, measures in consideration of the setting conditions in the conflicting relation have not been taken, and it has been difficult to easily make a control program operating on a browser compatible with a new device.

SUMMARY OF THE INVENTION

It is an object of the present invention to at least partially solve the problems in the conventional technology.

An information processing apparatus has a browser that displays a screen on a display unit and includes a processor and a storage unit, a communication unit, first to third obtaining units, and a detecting unit. The storage unit stores therein first setting information prescribing therein setting conditions that are able to be set when the information processing apparatus executes processing and that are associated with setting values settable for each setting item; and conflict information indicating conflicting relations among the setting conditions that conflict when the information processing apparatus executes the processing. The communication unit accesses, via the browser, a Web application installed in an external apparatus, and obtains, from the external apparatus, a screen to be displayed on the display unit and one or more scripts. The first obtaining unit functions when the processor executes the obtained one or more scripts on the browser, and that obtains the first setting information stored in the storage unit. The second obtaining unit functions when the processor executes the obtained one or more scripts on the browser, and that obtains, from the Web application, second setting information prescribing therein the setting conditions set on the Web application that transmits a processing request to the information processing apparatus. The third obtaining unit functions when the processor executes the obtained one or more scripts on the browser, and that obtains the conflict information stored in the storage unit. The detecting unit functions when the processor executes the obtained one or more scripts on the browser, and that detects, based on the conflict information obtained by the third obtaining unit, setting conditions in a conflicting relation, from the setting conditions prescribed in the second setting information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a data configuration of second setting information;

FIG. 5 is a diagram illustrating an example of a data configuration of management information;

FIG. 17 is an explanatory diagram of scripts;

FIG. 22 is a flow chart illustrating a routine of processing of Step S2120 in FIG. 20.

DETAILED DESCRIPTION OF THE PREFERRED EMBODIMENTS

Hereinafter, with reference to the appended drawings, embodiments of an information processing apparatus, an information processing method, an information processing program, and an information processing system, according to the present invention, will be described in detail. The present invention is not limited by these embodiments.

First Embodiment

Figure 1:
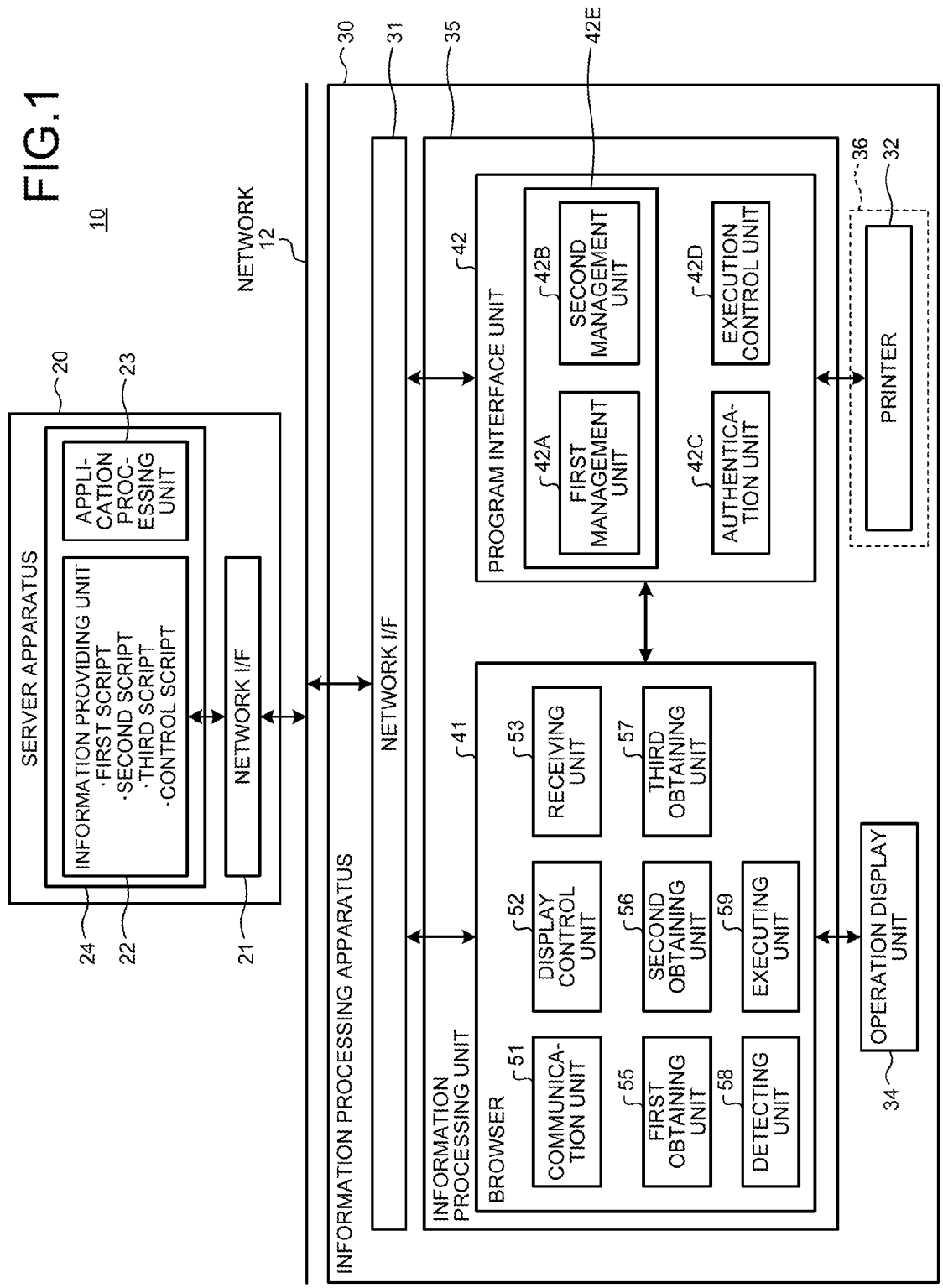
FIG. 1 is a diagram illustrating a configuration of an information processing system according to an embodiment.

FIG. 1 is a diagram illustrating a configuration of an information processing system 10 according to this embodiment. The information processing system 10 includes a server apparatus 20, and an information processing apparatus 30.

The server apparatus 20 and the information processing apparatus 30 are connected to each other via a network 12. The network 12 may be, for example: a network, such as the Internet connected to the public; or a local network in a firm or the like. The network 12 may be wired or wireless.

The server apparatus 20 is accessed from the information processing apparatus 30.

The server apparatus 20 has a network I/F 21, and a Web application 24. The network I/F 21 is an interface for implementing communication with another apparatus via the network 12.

The Web application 24 is accessed from the information processing apparatus 30, via a later described browser of the information processing apparatus 30. The Web application 24 includes an information providing unit 22, and an application processing unit 23.

The application processing unit 23 is accessed from the information processing apparatus 30, via the browser of a later described information processing unit 35 of the information processing apparatus 30. A user accesses the application processing unit 23 via the browser of the information processing apparatus 30, and sets, on the Web application 24, various setting conditions of processing executed by the information processing apparatus 30. The application processing unit 23 manages the set setting conditions. The Web application 24 transmits a processing request including the setting conditions set on the Web application 24, to the information processing apparatus 30. Details of the setting conditions will be described later.

The information providing unit 22 provides one or more scripts to the information processing apparatus 30 via the network 12. These scripts are provided to the information processing apparatus 30 from the server apparatus 20 when the information processing apparatus 30 obtains an operation program from the server apparatus 20 and executes the operation program. The operation program is a hypertext markup language (HTML) file described in HTML, and these scripts are embedded in the operation program. Further, in the operation program, information (for example, basic items, a frame to be used in display, and the like) is described, which is used in generation of a screen to be displayed from the server apparatus 20 on a display unit (a later described operation display unit 34) of the information processing apparatus 30. The screen is a user interface that displays thereon various types of information and images and receives operating instructions from the user.

The one or more scripts include, for example, plural scripts. These scripts are script programs to be executed on the browser of the information processing apparatus 30. These scripts are described, for example, in hypertext markup language (HTML).

The information processing apparatus 30 includes a processor. The information processing apparatus 30 has a network I/F 31, a device 36, the operation display unit 34, and the information processing unit 35. The network I/F 31 is an interface for transmitting and receiving information to and from another apparatus via the network 12.

The device 36 is a device that executes various types of processing. The device 36 has, for examples, at least one function of: a scanner; a printer; and a facsimile. In this embodiment, an example, where the device 36 is a printer 32, will be described.

The printer 32 prints out text, images, and the like, according to data, on sheets of paper or the like. The information processing apparatus 30 may have a configuration including another device 36.

The operation display unit 34 displays information to the user and receives input from the user. The operation display unit 34 is, for example, a touch panel. Further, the operation display unit 34 may have operation buttons, a mouse, a keyboard, or the like.

The information processing unit 35 has a browser 41 that displays a screen on the operation display unit 34. The information processing unit 35 accesses, via the browser 41, the Web application 24 installed in the server apparatus 20, and obtains the operation program from the server apparatus 20. Thereby, the information processing unit 35 obtains a screen to be displayed on the operation display unit 34 and the one or more scripts from the server apparatus 20. By executing each of the one or more scripts on the browser 41, the information processing unit 35 functions as a control program that controls the device 36.

In detail, the information processing unit 35 has the browser 41, and a program interface unit 42.

The program interface unit 42 is a software interface for controlling operation of the printer 32 from the browser 41. The program interface unit 42 controls the printer 32 according to various requests from the browser 41.

The program interface unit 42 includes a storage unit 42E, an authentication unit 42C, and an execution control unit 42D. The storage unit 42E includes a first management unit 42A, and a second management unit 42B.

The first management unit 42A stores therein first setting information. The first setting information is information prescribing therein setting conditions, which are able to be set when the information processing apparatus 30 executes processing, and which are associated with setting values that are able to be set for each setting item. That is, the first setting information is information prescribing therein setting conditions, which are able to be set when the device 36 executes processing.

Figure 2:
FIG. 2 is a diagram illustrating an example of a data configuration of first setting information.

FIG. 2 is a diagram illustrating an example of a data configuration of first setting information 64. Setting conditions prescribed in the first setting information 64 include setting items and setting values.

The setting items included in the setting conditions prescribed in the first setting information 64 are information indicating functions that are able to be specified and changed by the user, among various functions installed in the device 36. The setting items are, for example, print color, print side, tray loaded with paper to be used in printing, number of copies, and the like. The setting items are not limited to these examples.

The setting values included in the setting conditions prescribed in the first setting information 64 are values corresponding to the respective setting items. The first setting information 64 prescribes therein, as "list of setting values", which is the setting values included in the setting conditions, possible values of setting values that are able to be set in the device 36. For example, in the first setting information 64; as "list of setting values" corresponding to the setting item, "print color (printColor)": "black and white"; "gray"; and "automatic setting", are associated therewith.

Returning to FIG. 1, the second management unit 42b stores therein conflict information. The conflict information indicates a conflicting relation between setting conditions that conflict with each other when the information processing apparatus 30 executes processing. Specifically, the conflict information indicates a conflicting relation between setting conditions that conflict with each other when the device 36 executes processing.

Figure 3:
FIG. 3 is a diagram illustrating an example of a data configuration of conflict information.

FIG. 3 is a diagram illustrating an example of a data configuration of conflict information 66. Being in a conflicting relation means being a combination of setting conditions that are not able to be simultaneously set in the information processing apparatus 30. In other words, being in a conflicting relation means being a combination of setting conditions that are not able to be executed in the information processing apparatus 30.

As illustrated in FIG. 3, for example, in the information processing apparatus 30: a setting condition of the setting item, "print side (printSide)", and a setting value, "magazine binding", corresponding to this setting item; and a setting condition of the setting item, "tray loaded with paper to be used in printing (paperTray)", and a setting value, "tray 2", corresponding to this setting item, are in a conflicting relation with each other, and are not able to be simultaneously set in the information processing apparatus 30 (printer 32).

FIG. 3 illustrates an example where two setting conditions are in a conflicting relation with each other. However, in the information processing apparatus 30, three or more setting conditions may have a conflicting relation with one another. Therefore, the conflict information 66 may be information indicating a combination of two or more conflicting setting conditions, and may include information indicating a combination of three or more conflicting setting conditions.

A configuration may be adopted, in which plural types of devices 36 are connected to the information processing unit 35. The plural types of devices 36 are different from each other in at least one of: their models; and functions installed therein.

In this case, the first management unit 42A may prerecord and manage the first setting information 64 corresponding to each of the respective devices 36. Further, the second management unit 42B may prerecord and manage the conflict information 66 corresponding to each of the respective devices 36.

Returning to FIG. 1, the authentication unit 42C receives a user ID input through an operation by the user on the operation display unit 34, and executes authentication for the user identified by the user ID. The execution control unit 42D controls the printer 32 according to various requests from the browser 41.

Next, the browser 41 will be described.

The browser 41 includes a communication unit 51, a display control unit 52, a receiving unit 53, a first obtaining unit 55, a second obtaining unit 56, a third obtaining unit 57, a detecting unit 58, and an executing unit 59. Each of these functional units functions when the processor of the information processing apparatus 30 executes, on the browser 41, the scripts obtains from the server apparatus 20.

The communication unit 51 accesses, via the browser 41, the Web application 24 installed in the server apparatus 20, and obtains, from the server apparatus 20, a screen to be displayed on the operation display unit 34 and the one or more scripts.

In this embodiment, a case, where the one or more scripts include plural scripts, will be described. Specifically, in this embodiment, for example, a case, where the one or more scripts include a first script, a second script, a third script, and a control script, will be described.

That is, in this embodiment, the first obtaining unit 55, the second obtaining unit 56, the third obtaining unit 57, and the detecting unit 58 respectively function when different scripts (the first script, the second script, the third script, and the control scripts) are respectively executed on the browser 41 by the processor.

The receiving unit 53 receives an operating instruction by the user of the operation display unit 34.

The first obtaining unit 55 functions when the processor executes the first script on the browser 41, and obtains the first setting information 64 from the first management unit 42A.

In detail, the first obtaining unit 55 obtains the first setting information 64 from the first management unit 42A. In a case where the first management unit 42A manages the first setting information 64 corresponding to each of the plural types of devices 36, the first obtaining unit 55 obtains the first setting information 64 corresponding to the device 36 to be executed from the first management unit 42A. Information indicating the device 36 to be executed may be obtained from the server apparatus 20, or may be obtained from the operation display unit 34.

The second obtaining unit 56 functions when the processor executes the second script on the browser 41. The second obtaining unit 56 obtains second setting information from the Web application 24 of the server apparatus 20.

The second setting information is information prescribing therein setting conditions set on the Web application 24 that transmits a processing request to the information processing apparatus 30.

FIG. 4 is a diagram illustrating an example of a data configuration of second setting information 62. Setting conditions prescribed in the second setting information 62 include setting items and setting values. In this embodiment, the setting conditions prescribed in the second setting information 62 include the setting items, the setting values, and lists of setting values.

As described above, the setting items included in the setting conditions prescribed in the second setting information 62 are, for example, print color, print side, tray loaded with paper to be used in printing, number of copies, and the like. The setting items are not limited to these examples.

The setting values included in the setting conditions prescribed in the second setting information 62 are set, for example, by operating instructions from the user via the operation display unit 34 of the information processing apparatus 30. That is, by accessing the Web application 24 of the server apparatus 20 via the browser 41 from the information processing apparatus 30, the browser 41 of the information processing apparatus 30 displays the lists of setting values included in the setting conditions prescribed in the second setting information 62 on the operation display unit 34. The lists of setting values included in the setting conditions prescribed in the second setting information 62 are lists of selectable setting values. The user selects desired setting values from the lists of setting values. Thereby, in association with the respective setting items, the setting values selected by the user are recorded as initial setting values, in the second setting information 62. This registration processing for the second setting information 62 is executed by the application processing unit 23.

Hereinafter, a setting value that has been set in the second setting information 62 will be referred to as "initial setting value". Therefore, the setting conditions prescribed in the second setting information 62 include initial setting values.

Returning to FIG. 1, the third obtaining unit 57 functions when the processor executes the third script on the browser 41. The third obtaining unit 57 obtains the conflict information 66 stored in the second management unit 42B.

In this embodiment, the third obtaining unit 57 obtains the conflict information 66 corresponding to the device 36 to be executed, from the second management unit 42B. The device 36 to be executed may be, for example, a device input by an operating instruction on the operation display unit 34 by the user.

The third obtaining unit 57 may obtain the conflict information 66 from the server apparatus 20. In this case, the server apparatus 20 may prestore the conflict information 66 per type of the devices 36 by associating the different pieces of conflict information 66 respectively with the types of devices 36. The third obtaining unit 57 may then obtain the piece of conflict information 66 corresponding to the device 36 to be executed, from the server apparatus 20.

The detecting unit 58 functions when the processor executes the control script on the browser 41. The detecting unit 58 detects, based on the conflict information 66 obtained by the third obtaining unit 57, any setting conditions that are in a conflicting relation, from the setting conditions prescribed in the second setting information 62.

In detail, the detecting unit 58 first reads the setting items included in the setting conditions prescribed in the second setting information 62. The detecting unit 58 then identifies any setting item included in the first setting information 64, from the read setting items. That is, the detecting unit 58 identifies any setting item prescribed in the first setting information 64 corresponding to the device 36, from the setting items that have been set on the Web application 24 (application processing unit 23).

The detecting unit 58 determines whether or not any other setting condition having a conflicting relation with the setting condition, which is in the second setting information 62, and which includes the identified setting item and the setting value corresponding to the setting item, is recorded in the conflict information 66. If it is recorded therein, the detecting unit 58 detects the setting condition that is in the conflicting relation.

The detecting unit 58 may carry out the detection of setting conditions in a conflicting relation, when the first obtaining unit 55, the second obtaining unit 56, and the third obtaining unit 57 respectively obtain the first setting information 64, the second setting information 62, and the conflict information 66.

Further, the detecting unit 58 may detect setting conditions in a conflicting relation, after the first obtaining unit 55, the second obtaining unit 56, and the third obtaining unit 57 have respectively obtained the first setting information 64, the second setting information 62, and the conflict information 66 and a change in a setting condition made by the user has been received.

In this case, when the receiving unit 53 receives the change in the setting condition by the user, the detecting unit 58 may detect a setting condition in a conflicting relation with the setting condition, for which the change has been received, from the setting conditions prescribed in the second setting information 62, based on the conflict information 66 obtained by the third obtaining unit 57.

Further, if any setting conditions in a conflicting relation are detected, the detecting unit 58 preferably changes a setting value included in a setting condition that is in the conflicting relation so as to resolve the conflicting relation between the setting conditions.

For example, it is assumed that the second setting information 62 includes a conflicting relation, which is prescribed in the conflict information 66, and which is between: a setting condition of the setting item, "print side (printSide)", and the setting value, "magazine binding", corresponding to the setting item; and a setting condition of the setting item, "tray loaded with paper to be used in printing (paperTray)", and the setting value, "tray 2", corresponding to the setting item.

In this case, the detecting unit 58 detects the setting conditions in the conflicting relation. The detecting unit 58 then changes a setting value included in at least one setting condition of the plural setting conditions in the conflicting relation so as to resolve the conflicting relation between the setting conditions.

Specifically, the detecting unit 58 changes, for example, the setting value, "tray 2" of one of the setting conditions in the conflicting relation to a setting value, "tray 1", that is not in the conflicting relation.

Detection processing by the detecting unit 58 is executed by updating of management information.

The management information is information recording therein: whether or not each of the setting items included in the setting conditions prescribed in the second setting information 62 has been prescribed in the first setting information 64; whether or not the list of setting values for each of those setting items is usable in the device 36; and the like.

The management information is updated by the first obtaining unit 55, the second obtaining unit 56, the third obtaining unit 57, and the detecting unit 58.

FIG. 5 is a diagram illustrating an example of a data configuration of management information 68. In the example illustrated in FIG. 5, the management information 68 includes "setting item", "setting value (finalized setting value and initial setting value)", "usability in device", "usability of each listed setting value", and "constraint information".

The setting items prescribed in the management information 68 are the same as the setting items included in the setting conditions prescribed in the second setting information 62.

The setting values prescribed in the management information 68 include finalized setting values, and initial setting values. The initial setting values are the same as the initial setting values included in the setting conditions prescribed in the second setting information 62. The finalized setting values are setting values that have been changed by the processing of resolving the conflicting relations by the detecting unit 58, and are setting values to be included in job data to be transmitted to the device 36.

"Usability in device" prescribed in the management information 68 indicates whether or not the corresponding setting item is usable in the device 36 to be executed.

"Usability of each listed setting value" prescribed in the management information 68 indicates whether or not each of the setting values listed in the corresponding "list of setting values" prescribed in the second setting information 62 (see FIG. 4) is usable in the device 36 to be executed.

"Constraint information" prescribed in the management information 68 is information indicating constraints, such as the maximum numbers of characters of the setting values, the maximum values of the setting values, and the minimum values of the setting values, these setting values having been recorded in "list of setting values" prescribed in the first setting information 64 (see FIG. 2).

Details of update processing of the management information 68 will be described later.

Returning to FIG. 1, the display control unit 52 functions when the processor executes the control script on the browser 41. The display control unit 52 displays various images and information, on the operation display unit 34.

For example, the display control unit 52 generates a screen to be displayed on the operation display unit 34, by: generating a frame of the screen, items to be displayed, and the like, in accordance with a description of the HTML of the operation program obtained from the server apparatus 20 (information to be used in generation of the screen (for example, basic items, a frame to be used in display, and the like)); and further embedding the setting item and the setting value corresponding to the setting item, for each of the setting conditions that have been set. The display control unit 52 then displays the generated screen on the operation display unit 34.

Figure 6:
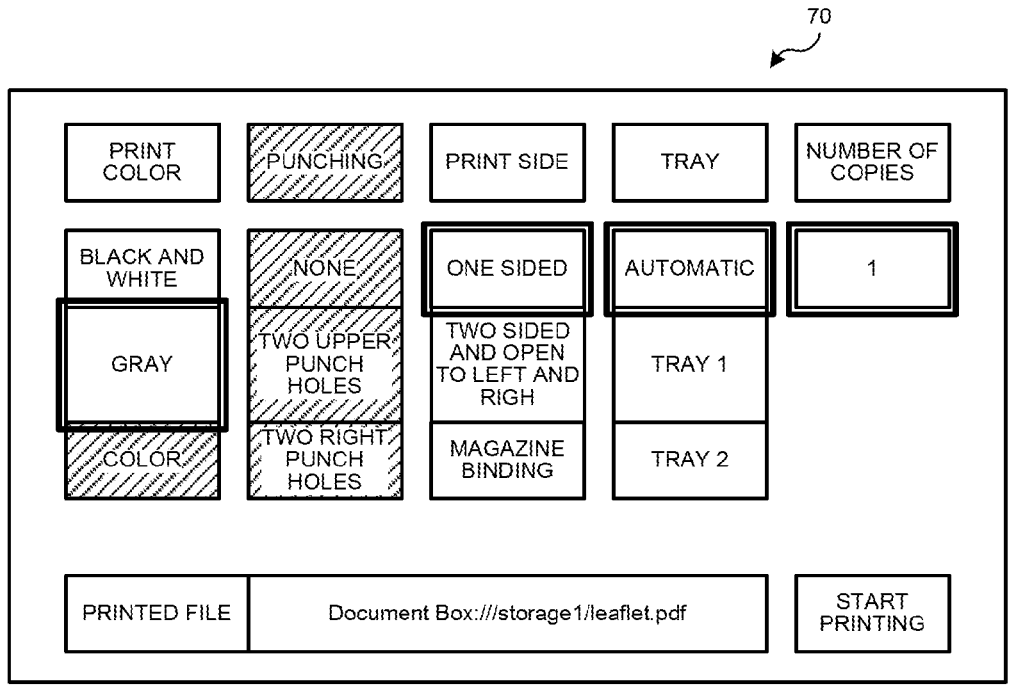
FIG. 6 is a schematic diagram illustrating an example of a screen.

FIG. 6 is a schematic diagram illustrating an example of a screen 70. For example, the screen 70 includes, as the setting items, "print color", "punching", "print side", "tray", and "number of copies". Of these setting items, setting items, which are not prescribed in the first setting information 64 prescribing therein a list of setting conditions provided by the device 36, are displayed to be unselectable as being unusable. In the example illustrated in FIG. 6, for example, the setting item not prescribed in the first setting information 64 and the corresponding list of setting values are displayed in gray, and are in display areas where operation input is not received. For example, the display area of the setting item, "punching", is a display area where operation input is not received.

Further, near the display area of each setting item, the setting values, which are prescribed in the second setting information 62 and correspond to the setting item, are displayed. Of these setting values, setting values not prescribed in the first setting information 64 provided by the device 36 are displayed to be unselectable as being unusable. In the example illustrated in FIG. 6, for example, the unusable setting values are displayed in gray, and are in display areas where operation input is not received. For example, display areas of: setting values, "none", "two upper punch holes", and "two right punch holes", of the setting item, "punching"; and the setting value, "color", of the setting item, "print color", are display areas where operation input is not received.

Further, of the setting values corresponding to each setting item, any setting values that have been finalized by the detecting unit 58 are highlight displayed. In the example illustrated in FIG. 6, the setting values that have been finalized by the detecting unit 58 are displayed by being surrounded by double lined frames.

The display control unit 52 generates the screen 70 based on the management information 68 and displays the screen 70 on the operation display unit 34.

Further, if any setting conditions in a conflicting relation are detected by the detecting unit 58, the display control unit 52 preferably displays, on the operation display unit 34, information indicating the setting conditions in the conflicting relation.

Figure 7:
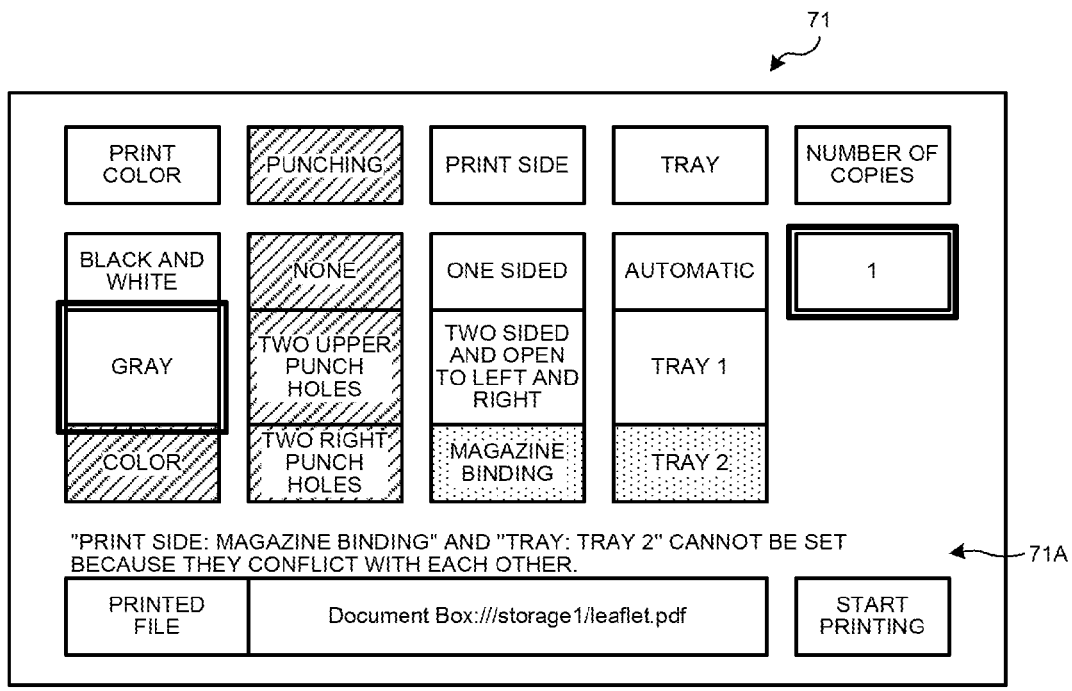
FIG. 7 is a schematic diagram illustrating an example of the screen.

FIG. 7 is a schematic diagram illustrating an example of a screen 71. For example, the display control unit 52 preferably displays, as the information indicating the conflicting relation, the screen 71 including information 71A, such as ""Print Side: magazine binding" and "Tray: tray 2" cannot be set because they conflict with each other.", on the operation display unit 34.

Further, the display control unit 52 preferably displays the setting values of the setting conditions in the conflicting relation in a mode indicating the setting conditions in the conflicting relation (for example, in a color different from the other areas). In the example illustrated in FIG. 7, the setting value, "magazine binding", and the setting value, "tray 2", are displayed in a color different from the other areas.

Further, if the conflicting relation between the setting conditions has been resolved by the detecting unit 58, the display control unit 52 may display, on the operation display unit 34, a setting condition that has been changed to resolve the conflicting relation between the setting conditions.

Figures 8, 9:
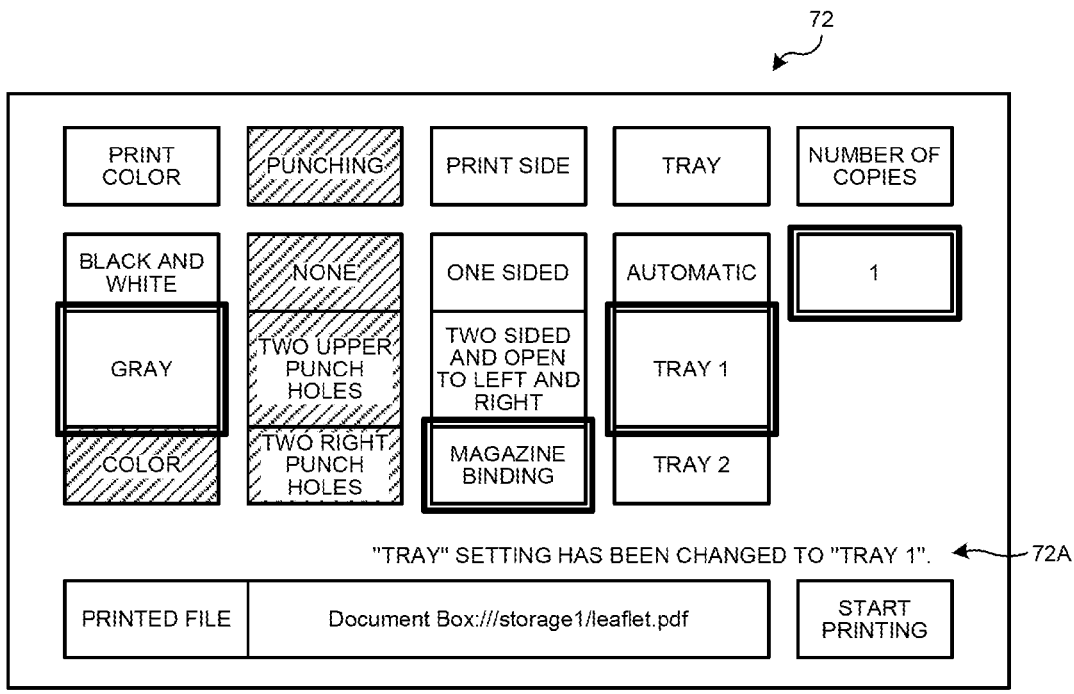
FIG. 8 is a schematic diagram illustrating an example of the screen.
FIG. 9 is a diagram illustrating an example of job data.

FIG. 8 is a schematic diagram illustrating an example of a screen 72. For example, it is assumed that the detecting unit 58 has changed the setting value, "tray 2", of the setting item, "tray", to "tray 1", in order to resolve the conflicting relation between the "Print Side: magazine binding" and "Tray: tray 2". In this case, the display control unit 52 may display the screen 72 displaying thereon the setting condition that has been changed, on the operation display unit 34. When the display control unit 52 displays this screen 72, the display control unit 52 may display the screen 72 including information 72A indicating that a setting value has been changed (for example, information 72A indicating that "Setting for "Tray" has been changed to "tray 1".") on the operation display unit 34.

Returning to FIG. 1, the executing unit 59 functions when the processor executes the control script on the browser 41. The executing unit 59 transmits execution instructions for various types of processing, to the device 36, via the program interface unit 42.

In this embodiment, the executing unit 59 transmits an execution request for print processing, the execution request including job data, via the program interface unit 42, to the printer 32.

FIG. 9 is a diagram illustrating an example of job data 69. The job data 69 include setting conditions including setting items recorded in the management information 68 (see FIG. 5), and finalized setting values respectively corresponding to the setting items. The printer 32 executes print processing according to the received job data 69.

Figure 10:
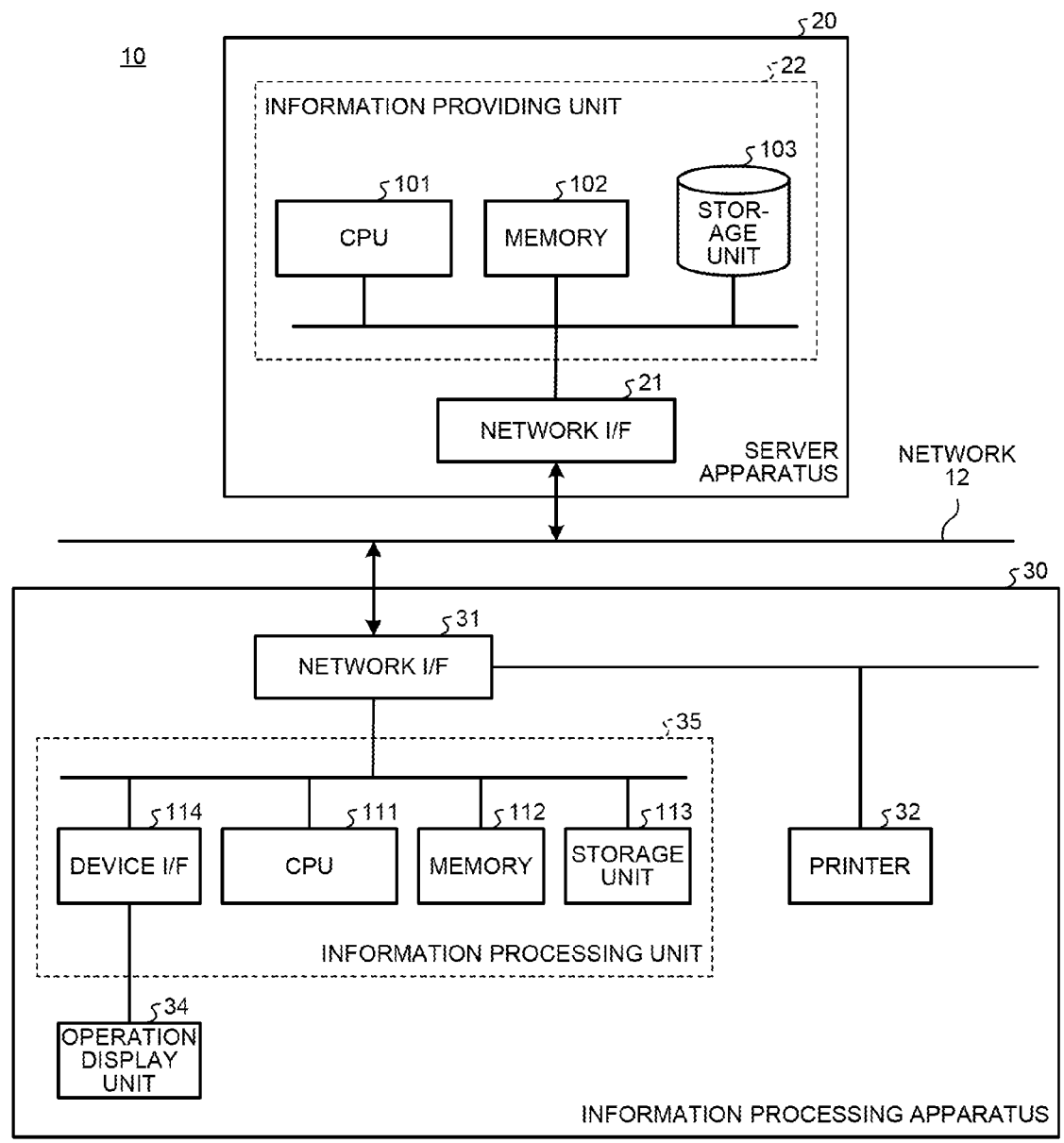
FIG. 10 is a diagram illustrating a hardware configuration of the information processing system according to the embodiment.

FIG. 10 is a diagram illustrating a hardware configuration of the information processing system 10 according to the embodiment. The information providing unit 22 of the server apparatus 20 includes, for example: a processor, such as a central processing unit (CPU) 101; a memory 102, such as a random access memory (RAM) and a read only memory (ROM); and a storage device 103, such as a hard disk drive (HDD). When the processor, such as the CPU 101, executes an operating system and a browser prestored in the storage device 103, the information providing unit 22 provides the first script, the second script, the third script, the control script, and the like, to the information processing apparatus 30.

The information processing unit 35 of the information processing apparatus 30 includes: the processor, such as a CPU 111; a memory 112, such as a RAM and a ROM; a storage device 113, such as an HDD; and a device I/F 114, which is an interface to the operation display unit 34. In the information processing unit 35, the processor, such as the CPU 111, loads and executes an operating system and a browser prestored in the storage device 113 on the memory 112.

The processor, such as the CPU 111, downloads the first script, the second script, the third script, and the control script from the server apparatus 20 via the network 12, and loads and executes these scripts on the memory 112. The processor, such as the CPU 111, is able to cause the information processing unit 35 to function as the communication unit 51, the first obtaining unit 55, the second obtaining unit 56, the third obtaining unit 57, the detecting unit 58, the executing unit 59, the display control unit 52, and the receiving unit 53, by executing these scripts.

Next, a routine of information processing executed by the information processing unit 35 of this embodiment will be described.

Figure 11:
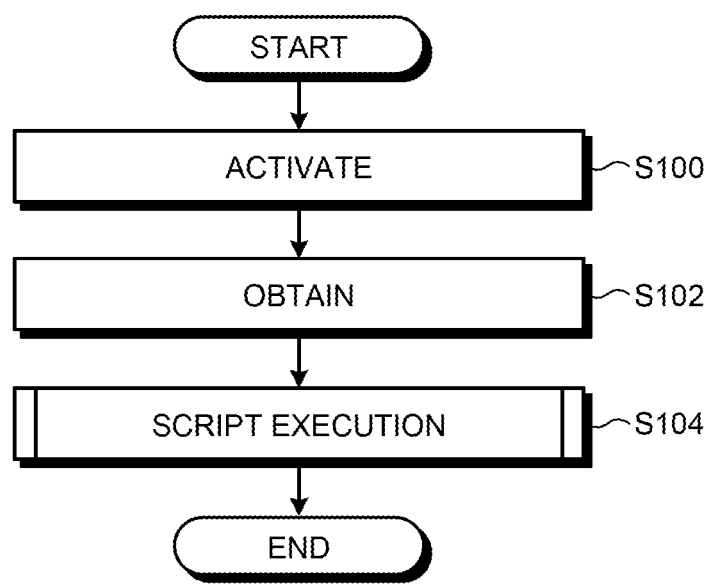
FIG. 11 is a flow chart illustrating an example of a routine of information processing.

FIG. 11 is a flow chart illustrating an example of the routine of the information processing executed by the information processing unit 35 of this embodiment.

First, the user activates the browser 41 of the information processing unit 35 by operating the operation display unit 34 (Step S100). By operating the operation display unit 34, the user then inputs a uniform resource identifier (URI) indicating where the operation program is stored, and instructs download of the operation program.

The communication unit 51 obtains the operation program from the server apparatus 20 (Step S102).

Next, the processor of the information processing unit 35 executes each script embedded in the operation program obtained in Step S102 on the browser 41 (Step S104) (details thereof described later). This routine is then ended.

Figure 12:
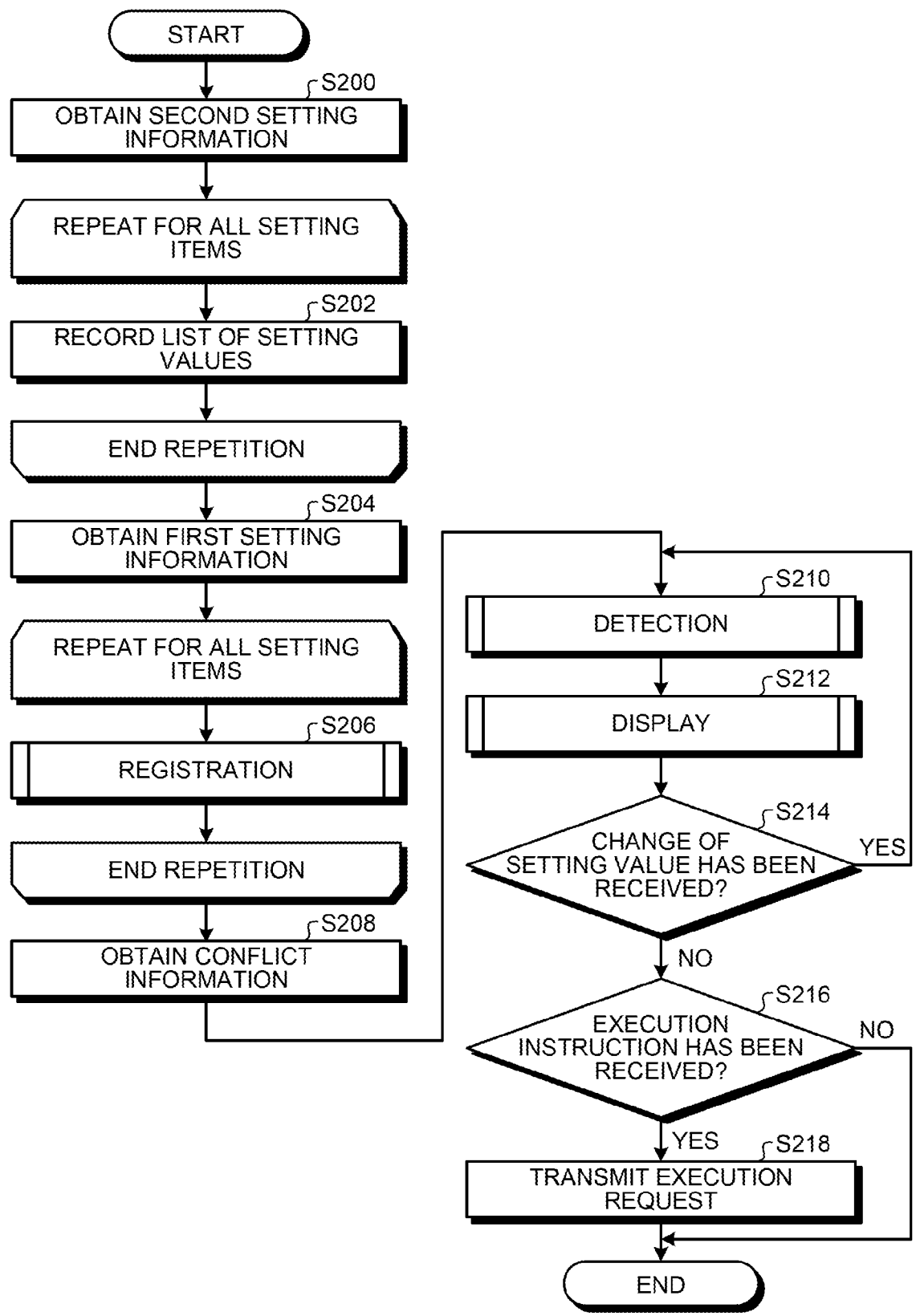
FIG. 12 is a flow chart illustrating an example of a routine of information processing.

Next, a routine of processing of Step S104 in FIG. 11 will be described. FIG. 12 is a flow chart illustrating an example of a routine of information processing implemented when the processor of the information processing unit 35 executes each of the scripts (the first script, the second script, the third script, and the control script) embedded in the operation program obtained in Step S102 (see FIG. 11).

First, the processor executes the second script on the browser 41. The second obtaining unit 56, which functions upon the execution of the second script, obtains the second setting information 62 (see FIG. 4) from the server apparatus 20 (Step S200).

Next, the second obtaining unit 56 records each of the setting items prescribed in the second setting information 62 obtained in Step S200 in the management information 68 (see FIG. 5). The second obtaining unit 56 then executes processing of Step S202 for each of all of the setting items prescribed in the second setting information 62.

At Step S202, the second obtaining unit 56 records a list of setting values corresponding to a setting item prescribed in the second setting information 62 in the column, "usability of each listed setting value", correspondingly (Step S202).

Next, the processor executes the first script embedded in the operation program obtained in Step S102 (see FIG. 11) on the browser 41. The first obtaining unit 55, which functions upon the execution of the first script, obtains the first setting information 64 corresponding to the device 36 to be executed, from the first management unit 42A (Step S204).

Next, the first obtaining unit 55 executes registration processing for each of all of the setting items prescribed in the second setting information 62 (see FIG. 4) obtained in Step S200 (details thereof described later).

By the processing in Step S206, in the management information 68 (see FIG. 5), of the setting items of the setting conditions prescribed in the second setting information 62, for any setting item prescribed in the first setting information 64, "usable" is recorded in the column, "usability in device". That is, of the setting items set on the Web application 24, any setting item with the column, "usability in device", being "usable" is a setting item prescribed in the first setting information 64.

Further, by the processing of Step S206, information is recorded, the information indicating usability in the device 36 of each of the setting values recorded in the column, "usability of each listed setting value", the setting values corresponding to the setting items with "usable" being recorded in the column, "usability in device", in the management information 68 (see FIG. 5).

Next, the processor executes the third script embedded in the operation program obtained in Step S102 (see FIG. 11) on the browser 41. The third obtaining unit 57, which functions by the execution of the third script, obtains the conflict information 66 corresponding to the device 36 to be executed, from the second management unit 42B (Step S208).

Next, the processor executes the control script embedded in the operation program obtained in Step S102 (see FIG. 11) on the browser 41. The detecting unit 58, which functions when the execution of the control script, executes, based on the conflict information 66 obtained in Step S208, detection of detecting any conflicting relation (Step S210) (details thereof described later).

Next, the display control unit 52 executes display processing of generating a screen and displaying the screen on the operation display unit 34 (Step S212) (details thereof described later).

Next, the receiving unit 53 determines whether or not a change instruction for a setting value by the user has been received from the operation display unit 34 (Step S214). If a positive determination is made at Step S214 (Step S214: Yes), the routine is returned to Step S210. If a negative determination is made at Step S214 (Step S214: No), the routine is advanced to Step S216.

At Step S216, the receiving unit 53 determines whether or not the receiving unit 53 has received, from the operation display unit 34, an execution instruction for printing (Step S216). For example, the user makes an instruction by operating on a display area of "Start Printing" on the screen 70 (or the screen 71, or the screen 72 (see FIG. 6 to FIG. 8)) displayed on the operation display unit 34. The receiving unit 53 may make the determination of Step S216 by determining whether or not a signal, which indicates that an instruction has been made by an operation on the display area of "Start Printing", has been received.

If a negative determination is made at Step S216 (Step S216: No), this routine is ended. On the contrary, if a positive determination is made at Step S216 (Step S216: Yes), the routine is advanced to Step S218.

At Step S218, the executing unit 59 transmits the execution request to the printer 32 via the program interface unit 42 (Step S218). The execution request includes the job data 69 (see FIG. 9) including: setting items with the column, "usability in device", being "usable" from the setting items recorded in the management information 68 (see FIG. 5); and the setting values indicated in "finalized setting value" corresponding to the setting items. The executing unit 59 generates the execution request including the job data 69 and transmits the execution request to the printer 32 via the program interface unit 42. The printer 32 executes print processing according to the received job data 69. This routine is then ended.

Figure 13:
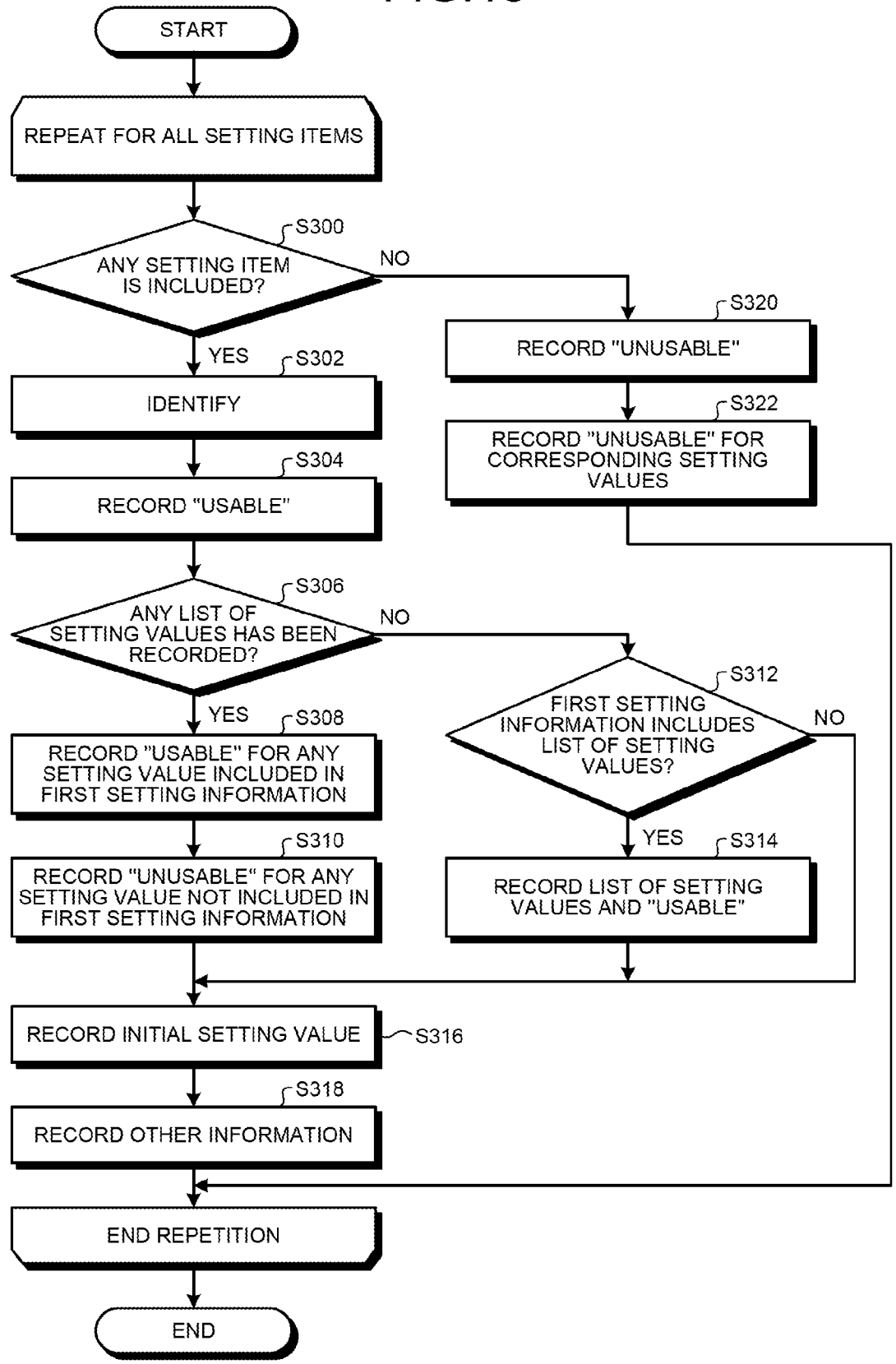
FIG. 13 is a flow chart illustrating an example of a routine of registration processing.

Next, registration processing of Step S206 in FIG. 12 will be described. FIG. 13 is a flow chart illustrating an example of a routine of the registration processing.

First, the first obtaining unit 55 repeatedly executes the processing of Step S300 to Step S322 for each of all of the setting items included in the second setting information 62 (see FIG. 4) obtained in Step S200 (see FIG. 12). That is, the first obtaining unit 55 repeatedly executes the processing of Step S300 to Step S322 for each of all of the setting items recorded in the management information 68.

First, the first obtaining unit 55 determines whether or not any setting item included in the second setting information 62 is included in the first setting information 64 obtained in Step S204 (see FIG. 12) (Step S300).

If any setting item is included, a positive determination is made (Step S300: Yes), and the routine is advanced to Step S302.

That is, by the positive determination in Step S300 (Step S300: Yes), the first obtaining unit 55 identifies any setting item included in the first setting information 64, from the setting items included in the second setting information 62 (Step S302).

Next, the first obtaining unit 55 records "usable" in a column of "usability in device" of the management information 68 (see FIG. 5) correspondingly to the identified setting item to be processed (Step S304).

For example, the setting item, "print color (printColor)" (see FIG. 4), prescribed in the second setting information 62 is prescribed in the first setting information 64 (see FIG. 2). Thus, the first obtaining unit 55 records "usable" in the column, "usability in device", correspondingly to the setting item, "print color (printColor)", in the management information 68 (see FIG. 5).

Next, the first obtaining unit 55 records each of the setting values, which are recorded in the column, "list of setting values", corresponding to the setting item to be processed, in the second setting information 62 (see FIG. 4), into the column, "usability of each listed setting value", correspondingly to the setting item to be processed, in the management information 68.

The first obtaining unit 55 then determines whether or not any "list of setting values" corresponding to the setting item to be processed has been recorded in the first setting information 64 (see FIG. 2) (Step S306).

For example, it is assumed that the setting item to be processed is "print color (printColor)". In the second setting information 62 (see FIG. 4), as "list of setting values" corresponding to the setting item, "print color (printColor)"; "black and white", "gray", and "color" are recorded. In this case, the first obtaining unit 55 makes a positive determination in Step S306 (Step S306: Yes).

If a positive determination is made at Step S306 (Step S306: Yes), the routine is advanced to Step S308. At Step S308, of the setting values recorded in the column, "usability of each listed setting value", corresponding to the setting item to be processed, in the management information 68 (see FIG. 5), the first obtaining unit 55 records "usable" for any setting value recorded in the column, "list of setting values", corresponding to that setting item of the first setting information 64 (see FIG. 2) (Step S308).

Next, of the setting values recorded in the column, "usability of each listed setting value", corresponding to the setting item to be processed, in the management information 68 (see FIG. 5), the first obtaining unit 55 records "unusable", for any setting value not recorded in the column, "list of setting values" corresponding to that setting item of the first setting information 64 (see FIG. 2) (Step S310).

The routine is then advanced to later described Step S316.

For example, of the respective setting values, "black and while", "gray", and "color", recorded in the column, "usability of each listed setting value", corresponding to the setting item, "print color (printColor)", in the management information 68, the first obtaining unit 55 records "usable", for the setting values, "black and while" and "gray", recorded in the column, "list of setting values", corresponding to that setting item, "print color (printColor)", of the first setting information 64 (see FIG. 2). On the contrary, the first obtaining unit 55 records "unusable", for the setting value, "color", that is not recorded therein (see FIG. 5).

If a negative determination is made at above described Step S306 (Step S306: No), the routine is advanced to Step S312.

For example, it is assumed that the setting item to be processed is "print side (printSide)". In the second setting information 62 (see FIG. 4), no setting values are recorded in the column, "list of setting values" corresponding to the setting item, "print side (printSide)". In this case, the first obtaining unit 55 makes a negative determination at Step S306 (Step S306: No).

At Step S312, the first obtaining unit 55 determines whether or not "list of setting values" corresponding to the setting item to be processed has been recorded in the first setting information 64 (see FIG. 2) (Step S312).

If a negative determination is made at Step S312 (Step S312: No), the routine is advanced to later described Step S316. On the contrary, if a positive determination is made at Step S312 (Step S312: Yes), the routine is advanced to Step S314.

At Step S314, in the column, "usability of each listed setting value" corresponding to the setting item to be processed, in the management information 68 (see FIG. 5), the first obtaining unit 55 records the setting values that have been recorded in "list of setting values" corresponding to that setting item that has been recorded in the first setting information 64 (Step S314). Further, the first obtaining unit 55 records "usable" correspondingly with each of the recorded setting values (Step S314).

Therefore, for example, the setting values, "automatic setting", "tray 1", and "tray 2", recorded in the first setting information 64 are recorded in the management information 68 (see FIG. 5) for the setting item, "tray (paperTray)", for which no setting values have been recorded in the second setting information 62, in the management information 68. Further, correspondingly with each of the setting values, "automatic setting", "tray 1", and "tray 2", of the management information 68, "usable" is recorded in the column, "usability of each listed setting value".

At Step S316, the first obtaining unit 55 records, in the management information 68, the initial setting value corresponding to the setting item to be processed, which has been recorded in the second setting information 62 (Step S316).

For example, if the setting item to be processed is the setting item, "print color (printColor)", the first obtaining unit 55 records the initial setting value, "gray", corresponding to the setting item, "print color (printColor)", in the second setting information 62, correspondingly with that setting item in the management information 68.

Next, the first obtaining unit 55 records any information that has not been recorded yet in the management information 68, from the information that has been recorded in the second setting information 62 (Step S318). This routine is then ended.

On the contrary, if a negative determination is made at above described Step S300 (Step S300: No), the routine is advanced to Step S320. At Step S320, the first obtaining unit 55 records "unusable" in the column, "usability in device", correspondingly with the identified setting item to be processed, in the management information 68 (see FIG. 5) (Step S320). The first obtaining unit 55 then records "unusable" for the corresponding setting values (see FIG. 5) (Step S322). This routine is then ended.

Figure 14:
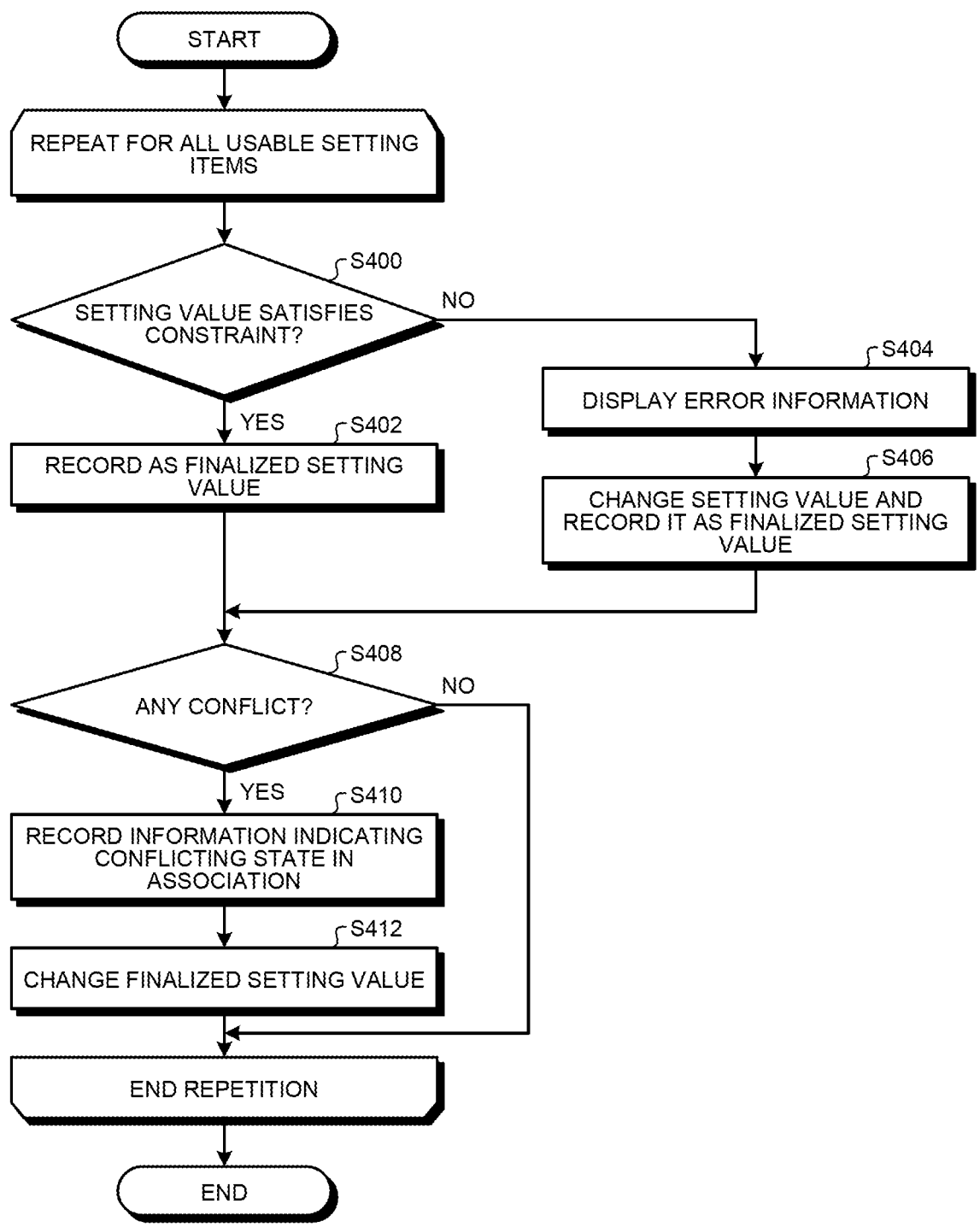
FIG. 14 is a flow chart illustrating an example of a routine of detection processing.

Next, detection processing of Step S210 in FIG. 12 will be described. FIG. 14 is a flow chart illustrating an example of a routine of the detection processing.

The detecting unit 58 repeatedly executes the processing of Step S400 to Step S412 for each of all of the setting items prescribed in the first setting information 64 corresponding to the device 63, of the setting items prescribed in the second setting information 62. That is, the detecting unit 58 repeatedly executes the processing of Step S400 to Step S412 for each of all of the setting items, with the column, "usability in device", being "usable", in the management information 68.

That is, the setting item to be processed in the routine of FIG. 14 is any of the plural setting items having "usable" in the column, "usability in device", in the management information 68.

Upon execution after returning to the detection processing of Step S210 by the positive determination in Step S214 of FIG. 12 (Step S214: Yes), the detecting unit 58 may execute the routine illustrated in FIG. 14 only for any setting item corresponding to the setting value, for which the change instruction has been received in Step S214.

That is, if the receiving unit 53 receives a change of a setting value, the detecting unit 58 may execute the routine illustrated in FIG. 14 for only the setting item of the setting value, for which the change has been received.

First, the detecting unit 58 determines whether or not the initial setting value corresponding to the setting item to be processed in the management information 68 (see FIG. 5) satisfies a constraint indicated in the corresponding constraint information (Step S400).

If the constraint is satisfied (Step S400: Yes), the routine is advanced to Step S402. At Step S402, the detecting unit 58 records the initial setting value corresponding to the setting item to be processed in the management information 68 as a finalized setting value (Step S402).

For example, if "gray" has been recorded in the column, "initial setting value", corresponding to the setting item to be processed, "print color (printColor)", in the management information 68, the detecting unit 58 records "gray" in the column, "finalized setting value", correspondingly to that setting item. The routine is then advanced to Step S408.

On the contrary, if the constraint is not satisfied (Step S400: No), the detecting unit 58 displays error information on the operation display unit 34 (Step S404). The error information is information indicating that the setting value of the setting item does not satisfy the constraint.

Next, the detecting unit 58 changes the initial setting value corresponding to the setting item to be processed to a value satisfying the constraint indicated in the corresponding constraint information, and records the changed value, as a finalized setting value (Step S406). The detecting unit 58 preferably records, as the changed value, a value that satisfies the constraint indicated in the corresponding constraint information and that does not have any conflicting relation indicated in the conflict information 66. The routine is then advanced to Step S408.

At Step S408, the detecting unit 58 determines whether or not the setting condition including the setting item to be processed has a conflicting relation with any other setting condition (Step S408).

In detail, the detecting unit 58 determines whether or not any other setting condition having a conflicting relation with the setting condition, which is in the management information 68 and which includes the setting item to be processed and the finalized setting value corresponding to the setting item, has been recorded in the conflict information 66. If it has been recorded in the conflict information 66, the detecting unit 58 detects the setting conditions that are in the conflicting relation (that is, detects that there is a conflict).

If there are no setting conditions in a conflicting relation, a negative determination is made at Step S408 (Step S408: No), and this routine is ended. If any setting conditions in a conflicting relation are detected, a positive determination is made at Step S408 (Step S408: Yes), and the routine is advanced to Step S410.

Next, the detecting unit 58 records, in the management information 68, in association with the setting item to be processed, information indicating that the setting item to be processed is in a conflicting state (Step S410). Next, the detecting unit 58 changes the finalized setting value corresponding to the setting item to be processed, in the management information 68, to a value resolving the conflicting relation between the setting conditions (Step S412). The detecting unit 58 may change the finalized setting value corresponding to the setting item included in the other setting condition in the conflicting relation to a value resolving the conflicting relation. Further, the detecting unit 58 may change both of these setting values to values resolving the conflicting relation. This routine is then ended.

Figure 15:
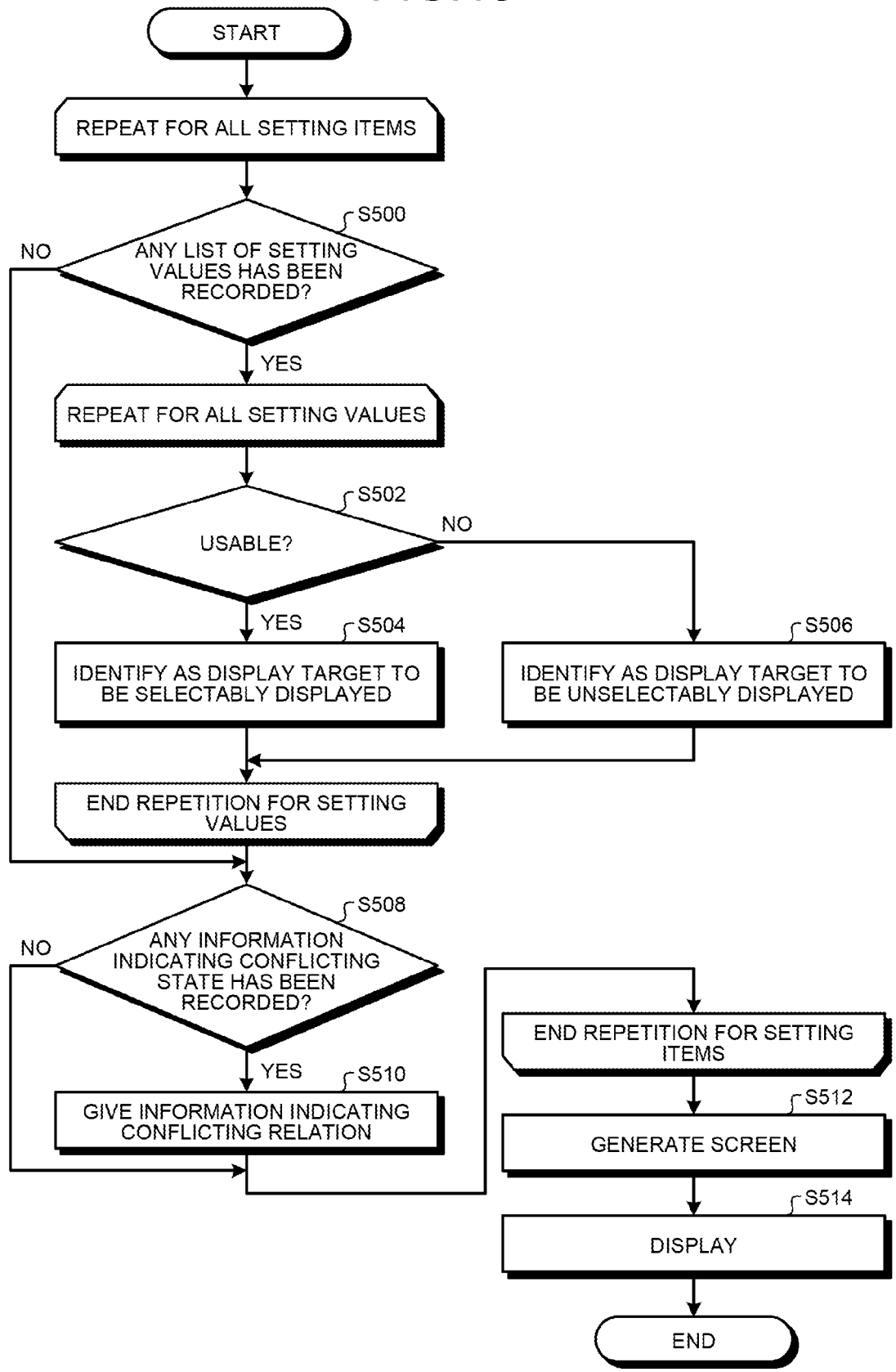
FIG. 15 is a flow chart illustrating an example of a routine of display processing.

Next, display processing of Step S212 in FIG. 12 will be described. FIG. 15 is a flow chart illustrating an example of a routine of the display processing.

The display control unit 52 repeatedly executes the processing of Step S500 to Step S510 for each of all of the setting items prescribed in the first setting information 64, of the setting items prescribed in the second setting information 62. That is, the display control unit 52 repeatedly executes the processing of Step S500 to Step S510 for each of all of the setting items having "usable" in the column, "usability in device", in the management information 68.

In other words, the setting item to be processed in the routine of FIG. 15 is any of the plural setting items having "usable" in the column, "usability in device", in the management information 68.

First, the display control unit 52 determines whether or not a list of setting values (list) have been recorded in the column, "usability of each listed setting value", correspondingly with the setting item to be processed, in the management information 68 (Step S500).

For example, a list of setting values, such as "black and white", "gray", and "color", has been recorded in the column, "usability of each listed setting value", correspondingly with the setting item to be processed, "print color (printColor)", in the management information 68. In this case, the operation display unit 34 makes a positive determination at Step S500 (Step S500: Yes).

On the contrary, in the column, "usability of each listed setting value", no list of setting values has been recorded correspondingly with the setting item to be processed, "number of copies (copiesRange)", in the management information 68. In this case, the display control unit 52 makes a negative determination at Step S500 (Step S500: No).

If a negative determination is made at Step S500 (Step S500: No), the routine is advanced to later described Step S508.

If a positive determination is made at Step S500 (Step S500: Yes), the display control unit 52 repeatedly executes the processing of Step S502 to Step S506 for each of all of the setting values included in the list of setting values determined in Step S500 as having been recorded.

First, the display control unit 52 determines whether or not "usable" has been recorded in association with the setting value to be processed (Step S502). In detail, the display control unit 52 determines whether or not "usable" is associated with the setting value to be processed, which has been recorded in the column, "usability of each listed setting value", correspondingly to the setting item to be processed, in the management information 68.

For example, "usable" is recorded in association with the setting value, "black and white", which has been recorded in the column, "usability of each listed setting value", correspondingly with the setting item to be processed, "print color (printColor)". In this case, the display control unit 52 makes a positive determination at Step S502 (Step S502: Yes).

If a positive determination is made at Step S502 (Step S502: Yes), the routine is advanced to Step S504. At Step S504, the display control unit 52 identifies the setting value to be processed as a display target to be selectably displayed (Step S504).

If a negative determination is made at Step S502 (Step S502: No), the routine is advanced to Step S506. At Step S506, the display control unit 52 identifies the setting value to be processed as a display target to be unselectably displayed (Step S506).

When the repeated processing of Step S502 to Step S506 is ended, the routine is advanced to Step S508.

At Step S508, the display control unit 52 determines whether or not information indicating that the setting item to be processed is in a conflicting relation has been recorded for the setting item to be processed (Step S508). If a negative determination is made at Step S508 (Step S508: No), this repeated processing is ended. If a positive determination is made at Step S508 (Step S508: Yes), the routine is advanced to Step S510.

At Step S510, the display control unit 52 gives information indicating the conflicting relation, to the setting item to be processed in the management information 68 (Step S510). The display control unit 52 may give, to the setting item to be processed in the management information 68, information indicating that the setting value has been changed in order to resolve the conflicting relation.

This repeated processing is then ended.

Next, the display control unit 52 generates, based on the management information 68, a screen (Step S512).

In detail, the display control unit 52 identifies, from the setting items recorded in the management information 68, any setting item having "usable" recorded in the column, "usability in device", and the corresponding list of setting values. The display control unit 52: generates a frame of the screen and items to be displayed, in accordance with the HTML description of the operation program obtained in Step S102 (see FIG. 11) from the server apparatus 20 (information used in generation of the screen (for example, basic items, a frame to be used in display, and the like)); and further generates the screen 70 by embedding the identified setting items and the lists of setting values in the screen (see FIG. 6). Of the setting items that have been recorded in the management information 68, the display control unit 52 displays the setting items having "unusable" in the column, "usability in device", and the corresponding lists of setting values, in, for example, gray, on the screen 70, to be unselectable.

Further, the display control unit 52 displays the list of setting values corresponding to each setting item recorded in the management information 68 on the screen 70.

Of the lists of these setting values, the display control unit 52 unselectably displays, as being unusable, any setting values identified in the above described Step S506 as display targets to be unselectably displayed. In the example illustrated in FIG. 6, for example, the unusable setting values are displayed in gray, and are in display areas where operation input is not received.

Further, the display control unit 52 selectably displays, as being usable, the setting values identified in the above described Step S504 as display targets to be selectably displayed. In the example illustrated in FIG. 6, for example, the usable setting values are displayed in white, and are in display areas where operation input is received.

Further, the display control unit 52 highlight displays the finalized setting values, of the lists of setting values that have been recorded in the management information 68. The finalized setting values may be read from the management information 68. In the example illustrated in FIG. 6, the finalized setting values are displayed by being surrounded with double lined frames.

If a piece of information indicating a conflicting relation, or a piece of information indicating that a setting value has been changed in order to resolve the conflicting relation, has been associated with a setting item, the display control unit 52 generates a screen further embedded with that piece of information. For example, the display control unit 52 generates the screen 71 including the information 71A indicating setting conditions in a conflicting relation (see FIG. 7) or the screen 72 including the information 72A indicating that a setting value has been changed (see FIG. 8) (Step S512).

The detecting unit 58 may execute the processing of changing a setting value included in setting conditions in a conflicting relation so as to resolve the conflicting relation (see Step S412 in FIG. 14) before the display of the screen on the operation display unit 34 in Step S514, or after the display.

Next, the display control unit 52 displays the generated screen on the operation display unit 34 (Step S514). This routine is then ended.

As described above, the information processing apparatus 30 of this embodiment has the browser 41 that displays a screen on the operation display unit 34. Further, the information processing apparatus 30 includes the processor, the storage unit 42E, the communication unit 51, the first obtaining unit 55, the second obtaining unit 56, the third obtaining unit 57, and the detecting unit 58. The storage unit 42E stores therein the first setting information 64 prescribing therein setting conditions, which are able to be set when the information processing apparatus 30 executes processing, and which are associated with setting values settable for each setting item; and the conflict information 66 indicating conflicting relations among setting conditions that conflict when the information processing apparatus 30 executes the processing. The communication unit 51 accesses, via the browser 41, the Web application 24 installed in the server apparatus 20, and obtains, from the server apparatus 20, a screen to be displayed on the operation display unit 34 and one or more scripts. The first obtaining unit 55 functions when the processor executes the obtained one or more scripts on the browser 41; and obtains the first setting information 64 stored in the storage unit 42E. The second obtaining unit 56 functions when the processor executes the obtained one or more scripts on the browser 41; and obtains, from the Web application 24, the second setting information 62 prescribing therein setting conditions set on the Web application 24 that transmits a processing request to the information processing apparatus 30. The third obtaining unit 57 functions when the processor executes the obtained one or more scripts on the browser 41; and obtains the conflict information 66 stored in the storage unit 42E. The detecting unit 58 functions when the processor executes the obtained one or more scripts on the browser 41; and detects, based on the conflict information 66 obtained by the third obtaining unit 57, any setting conditions in a conflicting relation, from the setting conditions prescribed in the second setting information 62.

As described, in the information processing apparatus 30 of this embodiment, a conflicting relation between conflicting setting conditions is detected when the information processing apparatus 30 executes processing, on the browser 41. Therefore, the information processing apparatus 30 is able to easily make the control program operating on the browser compatible with a new device having conflicting setting conditions.

Therefore, the information processing apparatus 30 of this embodiment is able to easily make the control program operating on the browser compatible with a new device having conflicting setting conditions.

Further, when a change of a setting condition by a user is received, the detecting unit 58 is able to detect, based on the conflict information 66 obtained by the third obtaining unit 57, any setting condition in a conflicting relation with the setting condition, for which the change has been received, from the setting conditions prescribed in the second setting information 62.

Further, when the detecting unit 58 detects any setting conditions in a conflicting relation, the detecting unit 58 is able to change a setting value included in a setting condition that is in the conflicting relation so as to resolve the conflicting relation of the setting conditions.

Further, the information processing unit 35 may include the display control unit 52. The display control unit 52 functions when the processor executes the one or more scripts obtained by the communication unit 51 on the browser 41; and displays information indicating setting conditions in a conflicting relation on the operation display unit 34, if the setting conditions in the conflicting relation are detected.

Further, the display control unit 52 may display, on the operation display unit 34, a setting condition that has been changed to cancel the setting condition in a conflicting relation.

Further, the one or more scripts include plural scripts, and the first obtaining unit 55, the second obtaining unit 56, the third obtaining unit 57, and the detecting unit 58 respectively function when different scripts are respectively executed by the processor on the browser 41.

Further, an information processing method of this embodiment is an information processing method executed by the information processing apparatus 30 including the information processing unit 35 having the processor that executes the browser 41. The information processing apparatus 30 includes the processor and the storage unit 42E. The storage unit 42E stores therein the first setting information 64 prescribing therein setting conditions, which are able to be set when the information processing apparatus 30 executes processing, and which are associated with setting values settable for each setting item; and the conflict information 66 indicating conflicting relations among setting conditions that conflict when the information processing apparatus 30 executes the processing.

The information processing method of this embodiment includes accessing, via the browser 41, the Web application 24 installed in the server apparatus 20 to obtain, from the server apparatus 20, a screen to be displayed on the operation display unit 34 and one or more scripts; functioning when the processor executes the obtained one or more scripts on the browser 41 to obtain the first setting information 64 stored in the storage unit 42E; functioning when the processor executes the obtained one or more scripts on the browser 41 to obtain, from the Web application 24, the second setting information 62 prescribing therein setting conditions set on the Web application 24 that transmits a processing request to the information processing apparatus 30; functioning when the processor executes the obtained one or more scripts on the browser 41 to obtain the conflict information 66 stored in the storage unit 42E; and functioning when the processor executes the obtained one or more scripts on the browser 41 to detect, based on the conflict information 66 obtained by the third obtaining unit 57, any setting conditions in a conflicting relation, from the setting conditions prescribed in the second setting information 62.

Further, an information processing program of this embodiment is an information processing program to be executed by a computer including the information processing unit 35 having the processor that executes the browser 41. The computer includes the processor and the storage unit 42E. The storage unit 42E stores therein the first setting information 64 prescribing therein setting conditions, which are able to be set when the information processing apparatus 30 executes processing, and which are associated with setting values settable for each setting item; and the conflict information 66 indicating conflicting relations among setting conditions that conflict when the information processing apparatus 30 executes the processing.

The information processing program of this embodiment includes accessing, via the browser 41, the Web application 24 installed in the server apparatus 20 to obtain, from the server apparatus 20, a screen to be displayed on the operation display unit 34 and one or more scripts; functioning when the processor executes the obtained one or more scripts on the browser 41 to obtain the first setting information 64 stored in the storage unit 42E; functioning when the processor executes the obtained one or more scripts on the browser 41 to obtain, from the Web application 24, the second setting information 62 prescribing therein setting conditions set on the Web application 24 that transmits a processing request to the information processing apparatus 30; functioning when the processor executes the obtained one or more scripts on the browser 41 to obtain the conflict information 66 stored in the storage unit 42E; and functioning when the processor executes the obtained one or more scripts on the browser 41 to detect, based on the conflict information 66 obtained by the third obtaining unit 57, any setting conditions in a conflicting relation, from the setting conditions prescribed in the second setting information 62.

The information processing system 10 of this embodiment includes the server apparatus 20, and the information processing apparatus 30. The information processing apparatus 30 is connected to the server apparatus 20 via the network 12, and has the browser 41 that displays a screen on the operation display unit 34.

The information processing apparatus 30 has the browser 41 that displays a screen on the operation display unit 34. Further, the information processing apparatus 30 includes the processor, the storage unit 42E, the communication unit 51, the first obtaining unit 55, the second obtaining unit 56, the third obtaining unit 57, and the detecting unit 58. The storage unit 42E stores therein the first setting information 64 prescribing therein setting conditions, which are able to be set when the information processing apparatus 30 executes processing, and which are associated with setting values settable for each setting item; and the conflict information 66 indicating conflicting relations among the setting conditions that conflict when the information processing apparatus 30 executes the processing. The communication unit 51 accesses, via the browser 41, the Web application 24 installed in the server apparatus 20, and obtains, from the server apparatus 20, a screen to be displayed on the operation display unit 34 and one or more scripts. The first obtaining unit 55 functions when the processor executes the obtained one or more scripts on the browser 41; and obtains the first setting information 64 stored in the storage unit 42E. The second obtaining unit 56: functions when the processor executes the obtained one or more scripts on the browser 41; and obtains, from the Web application 24, the second setting information 62 prescribing therein setting conditions set on the Web application 24 that transmits a processing request to the information processing apparatus 30. The third obtaining unit 57 functions when the processor executes the obtained one or more scripts on the browser 41; and obtains the conflict information 66 stored in the storage unit 42E. The detecting unit 58 functions when the processor executes the obtained one or more scripts on the browser 41; and detects, based on the conflict information 66 obtained by the third obtaining unit 57, any setting conditions in a conflicting relation, from the setting conditions prescribed in the second setting information 62.

Modified Example

In the above described embodiment, a case where the device 36 is the printer 32, is described as an example. However, the device 36 is not limited to the printer 32. For example, the device 36 may include at least one function of: a projecting function; a video recording function; and an image displaying function.

The device 36 including a projecting function is, for example, a projector. If the device 36 is a projector, the setting items and setting values prescribed in each of the first setting information 64 (see FIG. 2), the second setting information 62 (see FIG. 4), and the conflict information 66 (see FIG. 3) may be modified according to the projector.

Specifically, in the first setting information 64 (see FIG. 2) and the second setting information 62 (see FIG. 4), as the setting items, functions that are able to be specified and changed by a user may be prescribed, from various functions installed in the projector. In this case, the setting items are, for example, resolution, image quality, brightness, magnification rate, reduction rate, and the like, of an image to be projected. The setting values may be values corresponding to each of these setting items. Further, in the second management unit 42B, as the conflict information 66 (see FIG. 3), information indicating conflicting relations among setting conditions, which conflict when the projector executes processing, may be prerecorded. If the device 36 is a projector, for example, in the conflict information 66, as setting conditions that are unable to be simultaneously set, a setting condition including the setting item, "resolution", and a setting condition including the setting item, "image quality", may be prerecorded in association with each other.

The device 36 including a video recording function is, for example, a video recording device. If the device 36 is a video recording device, the setting items and setting values prescribed in each of the first setting information 64 (see FIG. 2), the second setting information 62 (see FIG. 4), and the conflict information 66 (see FIG. 3) may be modified according to the video recording device.

Specifically, in the first setting information 64 (see FIG. 2) and the second setting information 62 (see FIG. 4), as the setting items, functions that are able to be specified and changed by a user may be prescribed, from various functions installed in the video recording device. In this case, the setting items are, for example, volume of data to be video recorded, image quality of the data to be video recorded, the number of sets of data to be video recorded, and the like. The setting values may be values corresponding to each of these setting items. Further, in the second management unit 42B, as the conflict information 66 (see FIG. 3), information indicating conflicting relations among setting conditions, which conflict when the video recording device executes processing, may be prerecorded. If the device 36 is a video recording device, for example, in the conflict information 66, as setting conditions that are unable to be simultaneously set, a setting condition including the setting item, "volume of data to be video recorded", and a setting condition including the setting item, "image quality of data to be video recorded", may be prerecorded in association with each other.

Further, the device 36 including an image displaying function is, for example, a television. If the device 36 is a television, the setting items and setting values prescribed in each of the first setting information 64 (see FIG. 2), the second setting information 62 (see FIG. 4), and the conflict information 66 (see FIG. 3) may be modified according to the television.

Specifically, in the first setting information 64 (see FIG. 2) and the second setting information 62 (see FIG. 4), as the setting items, functions that are able to be specified and changed by a user may be prescribed, from various functions installed in the television. In this case, the setting items are, for example, contracted channel of pay broadcast, contracted program of pay broadcast, the number of contracted channels, and the like. The setting values may be values corresponding to each of these setting items. Further, in the second management unit 42B, as the conflict information 66 (see FIG. 3), information indicating conflicting relations among setting conditions, which conflict when the television executes processing, may be prerecorded. If the device 36 is a television, for example, in the conflict information 66, as setting conditions that are unable to be simultaneously set, a setting condition including the setting item, "contracted channel of pay broadcast", and a setting condition including a setting item, "contracted program of pay broadcast, which is not broadcasted on the channel", may be prerecorded in association with each other.

Similarly to the above described embodiment, the information processing apparatus 30 may detect any conflicting relation of setting conditions that conflict when the information processing apparatus 30 executes processing, on the browser 41. Therefore, even when the device 36 is a device other than the printer 32, the information processing apparatus 30 achieves effects similar to those of the above described embodiment.

Second Embodiment

Figure 16:
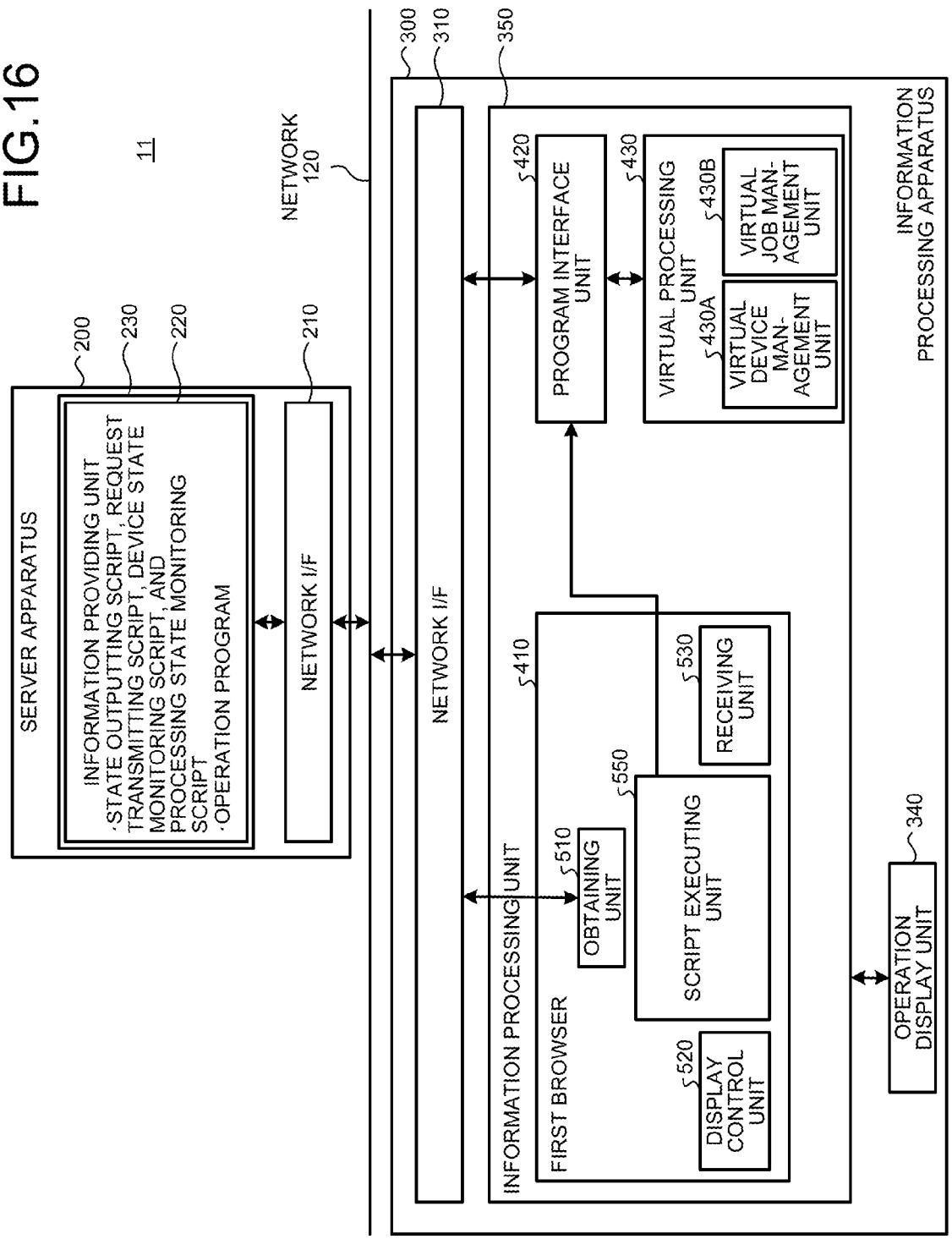
FIG. 16 is a diagram illustrating a configuration of the information processing system according to the embodiment.

FIG. 16 is a diagram illustrating a configuration of an information processing system 11 according to this embodiment. The information processing system 11 includes a server apparatus 200, and an information processing apparatus 300.

The server apparatus 200 and the information processing apparatus 300 are connected to each other via a network 120. The network 120 may be, for example, a network, such as the Internet connected to the public, or a local network in a firm or the like. Further, the network 120 may be wired or wireless.

The server apparatus 200 is accessed from the information processing apparatus 300. Via the network 120, the server apparatus 200 transmits information to the information processing apparatus 300 and receives information from the information processing apparatus 300.

The server apparatus 200 and the information processing apparatus 300 may be arranged in the same network (for example, a local area network), or arranged in separate networks.

The server apparatus 200 has a network I/F 210, and a Web application 230. The network I/F 210 is an interface for transmitting and receiving information to and from another apparatus via the network 120.

The Web application 230 is accessed from the information processing apparatus 300, via a later described first browser 410 of the information processing apparatus 300. The Web application 230 includes an information providing unit 220. The information providing unit 220 provides one or more scripts to the information processing apparatus 300 via the network 120.

These scripts are provided to the information processing apparatus 300 from the server apparatus 200, by the information processing apparatus 300 obtaining an operation program from the server apparatus 200 and executing the operation program. The operation program is a hypertext markup language (HTML) file described in HTML, and these scripts are embedded in the operation program. Further, in the operation program, information (for example, basic items, a frame to be used in display, and the like) is described, which is used in generation of a screen to be displayed from the server apparatus 200 on a display unit (a later described operation display unit 340) of the information processing apparatus 300. The screen is a user interface that displays thereon various types of information and images and receives operating instructions from a user.

In this embodiment, the one or more scripts include plural scripts. These scripts are script programs to be executed on a browser of the information processing apparatus 300. These scripts are described, for example, in hypertext markup language (HTML).

The one or more scripts are script programs to be executed on the first browser 410 of the information processing apparatus 300. The one or more scripts are script programs describing specific processing in a second browser (details thereof described later).

The second browser is a browser that displays a screen specific to a device. That is, the second browser is a browser dedicated to the device. The device is, for example, a device including at least one of: an image generating function (printer function); a scanner function; a facsimile function; a projecting function of a projector or the like; a video recording function; an image displaying function (television); and the like.

The first browser 410 is a browser other than the second browser and is a known general purpose browser. Therefore, the first browser 410 includes various functions not provided in the second browser. In this embodiment, the information processing apparatus 300 has the first browser 410 (details thereof described later).

In this embodiment, the information processing apparatus 300 functions as an emulator of the device.

For the information processing apparatus 300 of this embodiment, complete emulation of all of functions usable in the second browser is not aimed. For example, for the information processing apparatus 300 of this embodiment, emulation of some exceptional operation with respect to operation according to states of the device and operation being executed in the device is not aimed.

Further, for the information processing apparatus 300 of this embodiment, differences between support functions of respective types of the first browser 410, which is a general purpose browser, are not considered.

The information processing apparatus 300 includes a processor. The information processing apparatus 300 has a network I/F 310, the operation display unit 340, and an information processing unit 350. The network I/F 310 is an interface for transmitting and receiving information to and from another apparatus via the network 120.

The operation display unit 340 displays information to the user and receives input from the user. The operation display unit 340 is, for example, a touch panel. Further, the operation display unit 340 may have operation buttons, a mouse, a keyboard, or the like.

A virtual processing unit 430 is a program that virtually executes various types of processing that the device to be emulated executes. The virtual processing unit 430 executes at least operation specific to the device. The virtual processing unit 430 is controlled from the first browser 410 via a program interface unit 420.

The virtual processing unit 430 includes a virtual device management unit 430A and a virtual job management unit 430B.

The virtual job management unit 430B repeatedly causes transition of only a state of processing being executed in the device, according to elapsed time. For example, the virtual job management unit 430B is a program that sequentially causes transition of only states of various types, such as converting print data to a data format printable in the device, printing the converted data on a recording medium, and completion of the printing, according to elapsed time.

That is, the virtual job management unit 430B is a program that virtually changes, in sequence, according to elapsed time, only the state of the processing being executed in the device, without executing data conversion processing, print processing, and the like actually executed by the device.

The completion of printing has, for example, types, such as normal completion, occurrence of a non-recoverable error, and occurrence of a recoverable error. These types of the completion of printing are able to be switched over as appropriate by, for example, an instruction made by the user operating on the operation display unit 340.

The virtual device management unit 430A is a program that causes transition of the state of the device by an instruction made by the user operating on the operation display unit 340. The states of the device are, for example, "state where processing is executable", "state where processing is being executed", "state where processing has stopped", and "state where processing is inexecutable".

The state where processing is executable is a state where processing is able to be started when an execution request for the processing is received. The state where processing is being executed is a state where processing is being executed in the device. The state where processing has stopped is a state where processing has stopped due to an error, such as a paper jam. The state where processing is inexecutable is a state where processing is not able to be started due to an error, such as a toner not being loaded.

For example, when "state where processing is executable" is instructed by an instruction made by the user operating the operation display unit 340, the virtual device management unit 430A causes transition of the state of the device to "state where processing is executable". That is, the virtual device management unit 430A is a program that causes virtual transition of only the state of the device by an instruction made by the user operating on the operation display unit 340, without executing the actual processing executed by the device.

The program interface unit 420 is a software interface for controlling operation of the virtual processing unit 430 from the first browser 410. The program interface unit 420 controls the virtual processing unit 430 according to various requests from the first browser 410.

In this embodiment, the program interface unit 420 transmits a request signal to the virtual processing unit 430, according to transmission of a request signal from the first browser 410. Further, the program interface unit 420 performs monitoring of the virtual processing unit 430 and transmits a result of the monitoring to the first browser 410, according to a request from the first browser 410.

As described above, the first browser 410 is a browser other than the second browser, and is a known general purpose browser. The processor of the information processing apparatus 300 accesses, via the first browser 410, the Web application 230 installed in the server apparatus 200, and obtains the operation program from the server apparatus 200. Thereby, the information processing unit 350 obtains a screen to be displayed on the operation display unit 340 and one or more scripts, from the server apparatus 200. The information processing unit 350 then causes each functional unit in the first browser 410 to function, by executing each of the one or more scripts on the first browser 410.

Specifically, the first browser 410 includes an obtaining unit 510, a script executing unit 550, a display control unit 520, and a receiving unit 530. These functional units function, by the scripts being executed on the first browser 410, the scripts obtained by the processor of the information processing apparatus 300 from the server apparatus 200.

The obtaining unit 510 accesses the Web application 230 installed in the server apparatus 200 via the first browser 410, and obtains the operation program (including the scripts).

The display control unit 520 functions when the processor executes the operation program on the first browser 410. For example, the display control unit 520 generates a screen, according to a description of HTML of the operation program obtained from the server apparatus 200 (for example, basic items, a frame to be used in display, and the like). The display control unit 520 then displays the generated screen on the operation display unit 340. This screen is a user interface, which displays various images, and receives input from the user.

The receiving unit 530 receives an instruction made by the user operating on the operation display unit 340.

The script executing unit 550 functions when the processor executes the one or more scripts obtained by the obtaining unit 510 on the first browser 410, and performs monitoring of the device (that is, the virtual processing unit 430) and signal transmission to the device (that is, the virtual processing unit 430).

The one or more scripts obtained from the server apparatus 200 are, as described above, script programs describing specific processing executed on the second browser for displaying a screen specific to the device. Further, the one or more scripts are script programs describing various types of processing for performing the monitoring of the device and the signal transmission to the device.

FIG. 17 is an explanatory diagram of the scripts. In this embodiment, a case, where the one or more scripts include a state outputting script, a request transmitting script, a device state monitoring script, and a processing state monitoring script, will be described.

The state outputting script is a script program that transmits state information of the device obtained from the device. The state information of the device includes information specific to the second browser, and account information authenticated in the device. The information specific to the second browser is, for example, a screen size of a display screen of the second browser.

When the processor executes the state outputting script on the first browser 410, the script executing unit 550 obtains the state information of the device from the virtual processing unit 430 via the program interface unit 420, and transmits (returns) the obtained state information to the first browser 410.

Therefore, in the first browser 410, when certain state information is obtained from the device and operation according to the obtained state information is emulated, by the state outputting script being executed on the first browser 410, operation specific to the second browser is able to be emulated on the first browser 410.

The request transmitting script is a script program that transmits a request signal to the device. The request signal is a signal for avoiding stoppage of operation by the device and causing the device to continue the operation. The request signal is, for example, a request signal requesting the device to not shift to an idle state, a request signal requesting a refusal to shift to the idle state to be cancelled, a request signal invalidating a "back button" of the browser before execution of processing in the device, a request signal validating the "back button" after the execution of processing is completed in the device, or the like.

When the processor executes the request transmitting script on the first browser 410, the script executing unit 550 transmits a request signal to the virtual processing unit 430 via the program interface unit 420.

Therefore, in the first browser 410, when the device receives a certain signal and operation of the device to continue processing without stopping is to be emulated, by the request transmitting script being executed on the first browser 410, operation specific to the second browser is able to be emulated on the first browser 410.

The device state monitoring script is a script program for monitoring states of the device. As described above, the states of the device are, for example, "state where processing is executable", "state where processing is being executed", "state where processing has stopped", "state where processing is inexecutable", and the like.

When the processor executes the device state monitoring script on the first browser 410; via the program interface unit 420, the script executing unit 550 performs monitoring of the state of the device through the virtual processing unit 430 and notifies the first browser 410 of a state of the device when the state is changed.

Therefore, in the first browser 410, in a case where operation of monitoring the state of the device is to be emulated, when the device state monitoring script is executed on the first browser 410, operation specific to the second browser is able to be emulated on the first browser 410.

The processing state monitoring script is a script program for monitoring states of processing being executed in the device. As described above, the states of processing are, for example, converting print data to a data format printable by the device, printing the converted print data on a recording medium, completion of the printing (normal completion, occurrence of a non-recoverable error, and occurrence of a recoverable error), and the like.

When the processor executes the processing state monitoring script on the first browser 410; via the program interface unit 420, the script executing unit 550 performs monitoring of the state of the processing being executed in the device by the virtual processing unit 430 and notifies the first browser 410 of a state of the processing when the state is changed.

Therefore, in the first browser 410, in a case where operation of monitoring the states of the processing by the device is emulated, when the processing state monitoring script is executed on the first browser 410, operation specific to the second browser is able to be emulated on the first browser 410.

Figure 18:
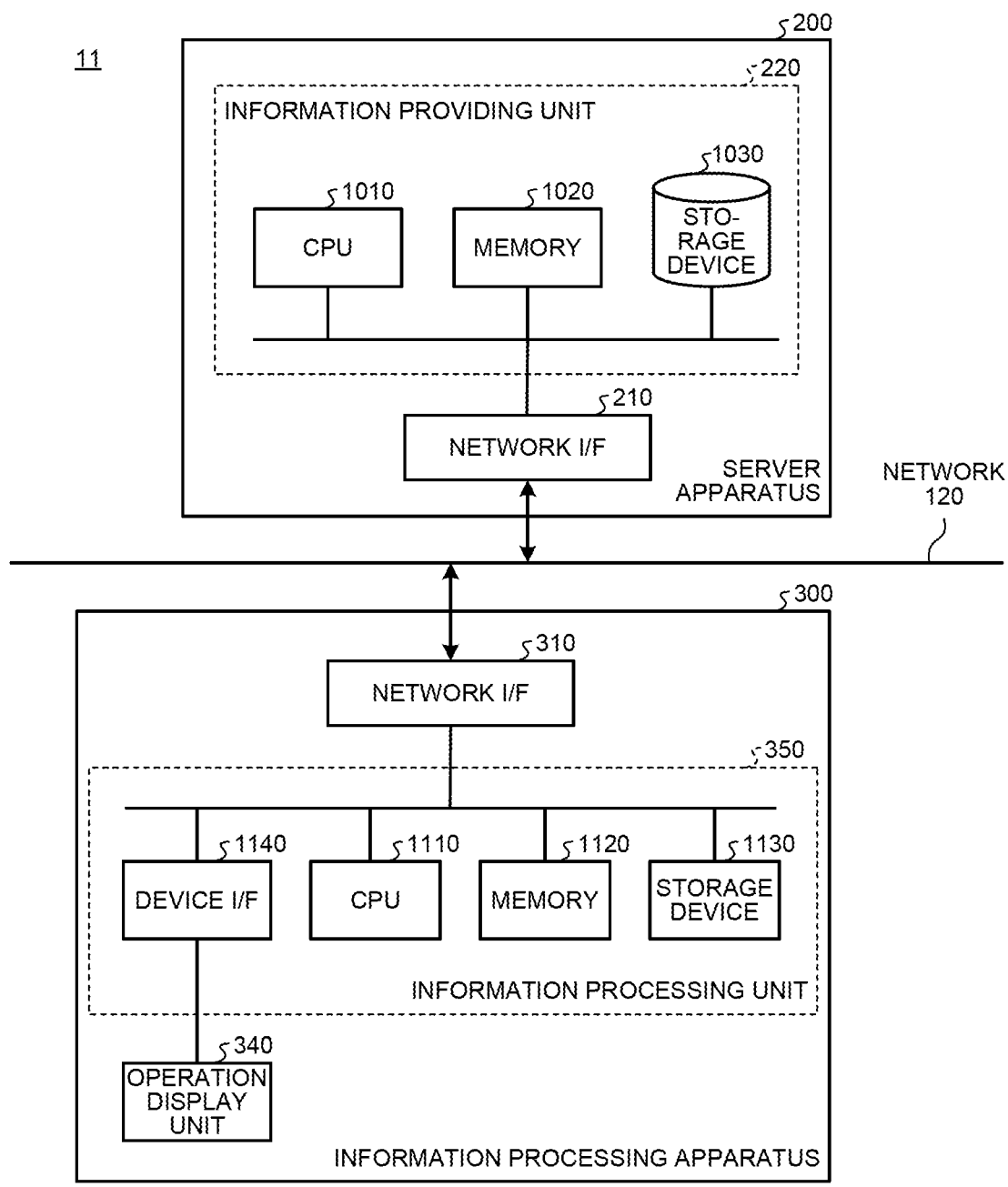
FIG. 18 is a diagram illustrating a hardware configuration of the information processing system.

FIG. 18 is a diagram illustrating a hardware configuration of the information processing system 11 according to this embodiment. The information providing unit 220 of the server apparatus 200 includes, for example, a processor, such as a central processing unit (CPU) 1010, a memory 1020, such as a random access memory (RAM) and a read only memory (ROM), and a storage device 1030, such as a hard disk drive (HDD). When the processor, such as the CPU 1010, executes an operating system prestored in the storage device 1030, the information providing unit 220 provides the operation program and one or more scripts to the information processing apparatus 300.

The information processing unit 350 of the information processing apparatus 300 includes the processor, such as a CPU 1110, a memory 1120, such as a RAM and a ROM, a storage device 1130, such as an HDD, and a device I/F 1140, which is an interface to the operation display unit 340. In the information processing unit 350, the processor, such as the CPU 1110, loads and executes an operating system and the first browser 410 prestored in the storage device 1130 on the memory 1120.

The processor, such as the CPU 1110, downloads the operation program (including the one or more scripts) from the server apparatus 200 via the network 120, and loads and executes the operation program on the memory 1120. Such an operation program (including one or more scripts) has a module configuration including a display control module, a receiving module, and a script processing module, and when the processor, such as the CPU 1110, executes these modules, the information processing unit 350 is able to be caused to function as the obtaining unit 510, the script executing unit 550, the display control unit 520, and the receiving unit 530.

Figure 19:
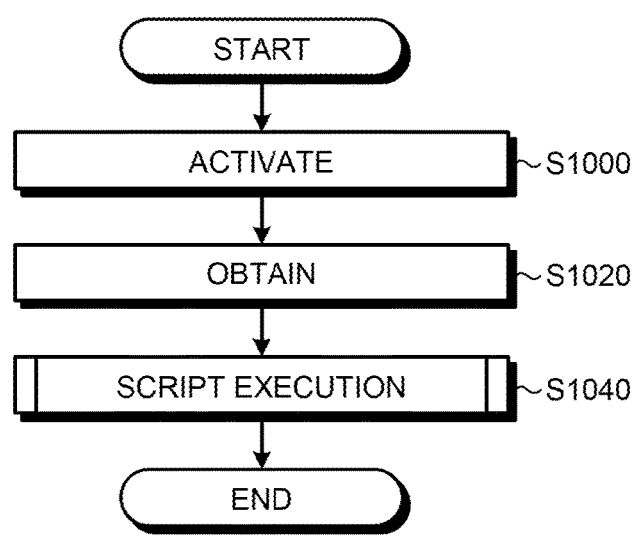
FIG. 19 is a flow chart illustrating an example of a routine of information processing.

FIG. 19 is a flow chart illustrating an example of a routine of information processing executed by the information processing unit 350 of this embodiment.

First, a user activates the first browser 410 by operating the operation display unit 340 (Step S1000). By operating the operation display unit 340, the user then inputs a uniform resource identifier (URI) indicating where the operation program including the one or more scripts is stored, and instructs download of the operation program. The obtaining unit 510 then obtains, from the server apparatus 200, the operation program including the one or more (plural, in this embodiment) scripts (Step S1020).

Next, the script executing unit 550 executes each of the scripts embedded in the operation program obtained in Step S1020 on the first browser 410 (Step S1040) (details thereof described later). This routine is then ended.

Figure 20:
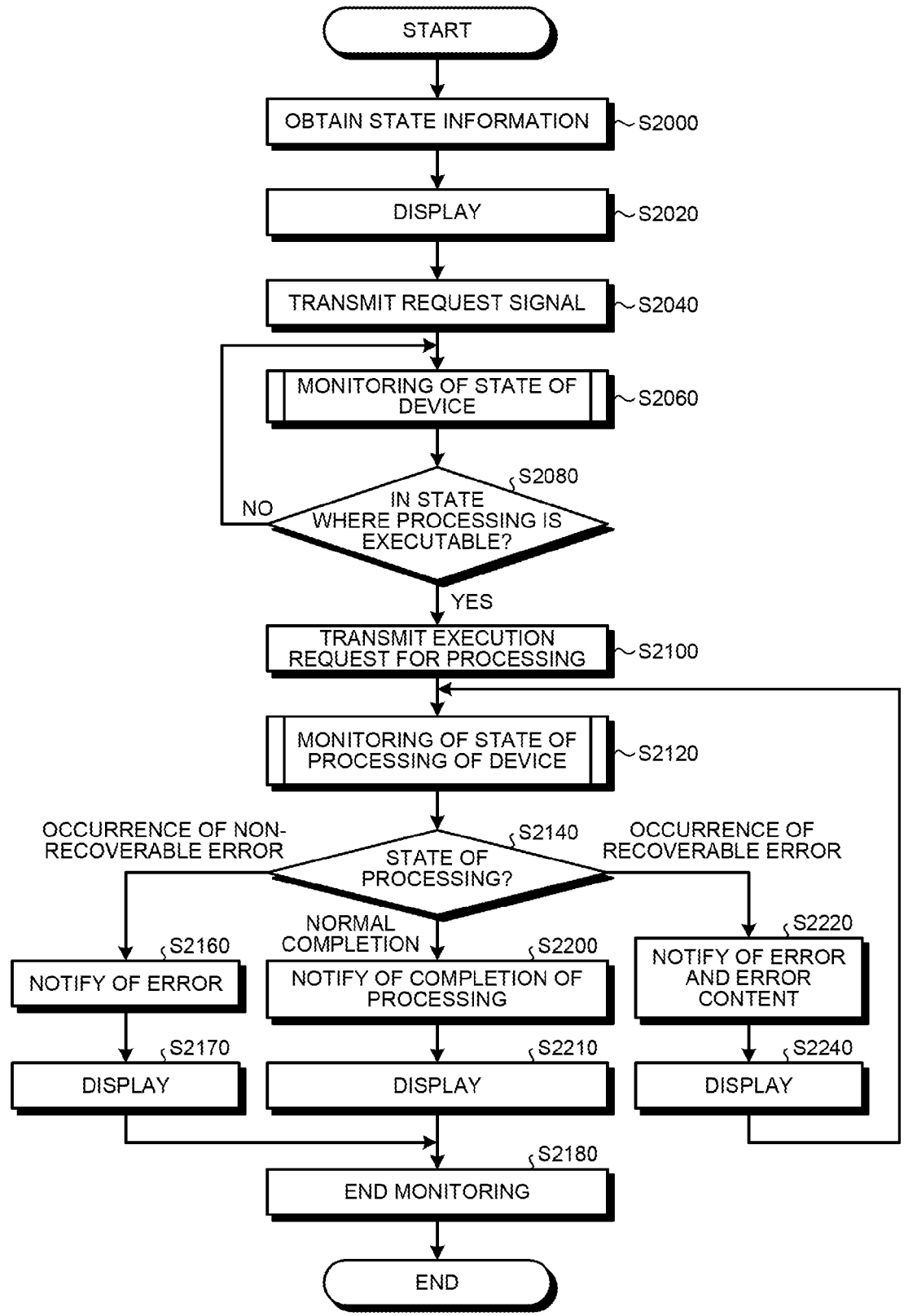
FIG. 20 is a flow chart illustrating a routine of processing of Step S1040 in FIG. 19.

Next, a routine of processing of Step S1040 in FIG. 19 will be described. FIG. 20 is a flow chart illustrating a routine of processing executed by the obtained script being executed.

In this embodiment, a case, where the script executing unit 550 executes each of the respective scripts included in the obtained plural scripts, which are the state outputting script, the request transmitting script, the device state monitoring script, and the processing state monitoring script, in this order, will be described. However, the order in which the script executing unit 550 executes these scripts is not limited to this order.

Further, the script executing unit 550 may execute at least one script of the respective scripts obtained from the server apparatus 200 (state outputting script, request transmitting script, device state monitoring script, and processing state monitoring script), and the embodiment is not limited to the mode where all of the scripts are executed.

First, the processor executes the state outputting script on the first browser 410. Thereby, the script executing unit 550 functions, and obtains state information of the device from the virtual processing unit 430 via the program interface unit 420 (Step S2000). The display control unit 520 displays the state information obtained in Step S2000 on the operation display unit 340 (Step S2020). For example, if the state information of the device includes account information, the display control unit 520 displays the account information authenticated by the device on the operation display unit 340. Further, for example, if the state information of the device includes a browser screen size used in the second browser, the display control unit 520 changes a screen size of a display screen of the first browser 410 to that browser screen size.

Next, the processor executes the request transmitting script on the first browser 410. Thereby, the script executing unit 550 functions, and transmits a request signal to the virtual processing unit 430 via the program interface unit 420 (Step S2040).

For example, the script executing unit 550 transmits a request signal requesting the device to not shift to an idle state, or a request signal requesting a refusal to shift to the idle state to be cancelled, to the virtual processing unit 430 via the program interface unit 420.

Transition of the virtual processing unit 430 that has received the request signal to a state according to the request signal is then caused.

Next, the processor executes the device state monitoring script on the first browser 410. Thereby, the script executing unit 550 functions, and performs monitoring of the state of the device through the virtual processing unit 430, via the program interface unit 420 (Step S2060). Details of processing of Step S2060 will be described later.

Next, when the processor executes the operation program, a determination of whether the device is in the state, where processing is executable by the virtual processing unit 430, is made (Step S2080). For example, by determining whether or not the state of the virtual processing unit 430 indicates "state where processing is executable", the determination of Step S2080 is made.

If a negative determination is made in Step S2080 (Step S2080: No), the routine is returned to above described Step S2060. If a positive determination is made in Step S2080 (Step S2080: Yes), the routine is advanced to Step S2100.

At Step S2100, when the processor executes the operation program, the display control unit 520 receives an execution instruction for processing, from the operation display unit 340. The user inputs the execution instruction for processing (for example, a print job) by operating the operation display unit 340. When the display control unit 520 receives the execution instruction, the display control unit 520 transmits the execution request for the processing to the virtual processing unit 430 via the program interface unit 420 (Step S2100).

Next, the processor executes the processing state monitoring script on the first browser 410. Thereby, the script executing unit 550 functions, and performs monitoring of the state of the processing of the device by the virtual processing unit 430 (Step S2120). Details of processing of Step S2120 will be described later.

Next, the script executing unit 550 determines which of types of print completion: occurrence of a non-recoverable error; normal completion; and occurrence of a recoverable error, the state of processing of the virtual processing unit 430 corresponds to (Step S2140).

The script executing unit 550 determines which of the types of print completion: "occurrence of a non-recoverable error"; "normal completion"; and "occurrence of a recoverable error", the state of the processing received from the virtual processing unit 430 via the program interface unit 420 indicates.

If the state of the processing received via the program interface unit 420 from the virtual processing unit 430 indicates the print completion of "occurrence of a non-recoverable error", the routine is advanced to Step S2160. At Step S2160, the script executing unit 550 notifies the first browser 410 of "occurrence of a non-recoverable error" (Step S2160).

When the first browser 410 receives the notification, the display control unit 520 displays information indicating "occurrence of a non-recoverable error" on the operation display unit 340 (Step S2170). The script executing unit 550 then ends the monitoring of the state of the processing being executed by the virtual processing unit 430 (Step S2180). This routine is then ended.

At Step S2140, if the script executing unit 550 determines that the state of the processing received via the program interface unit 420 from the virtual processing unit 430 indicates the print completion, "normal completion", the routine is advanced to Step S2200. At Step S2200, the script executing unit 550 notifies the first browser 410 of "completion of processing" (Step S2200).

When the first browser 410 receives the notification, the display control unit 520 displays information indicating "completion of processing" on the operation display unit 340 (Step S2210). The routine is then advanced to Step S2180.

On the contrary, at Step S2140, if the script executing unit 550 determines that the state of the processing received via the program interface unit 420 from the virtual processing unit 430 indicates the print completion, "occurrence of a recoverable error", the routine is advanced to Step S2220. At Step S2220, the script executing unit 550 notifies the first browser 410 of the occurrence of a recoverable error and a content of the error (Step S2220).

When the first browser 410 receives the notification, the display control unit 520 displays the occurrence of an error and the content of the error, on the operation display unit 340 (Step S2240). The user refers to the error content displayed on the operation display unit 340 and performs operation to resolve the error. For example, the user operates the operation display unit 340 and changes the content of the print completion of the virtual job management unit 430B to a content indicating "normal completion". The routine is then returned to above described Step S2120.

Figure 21:
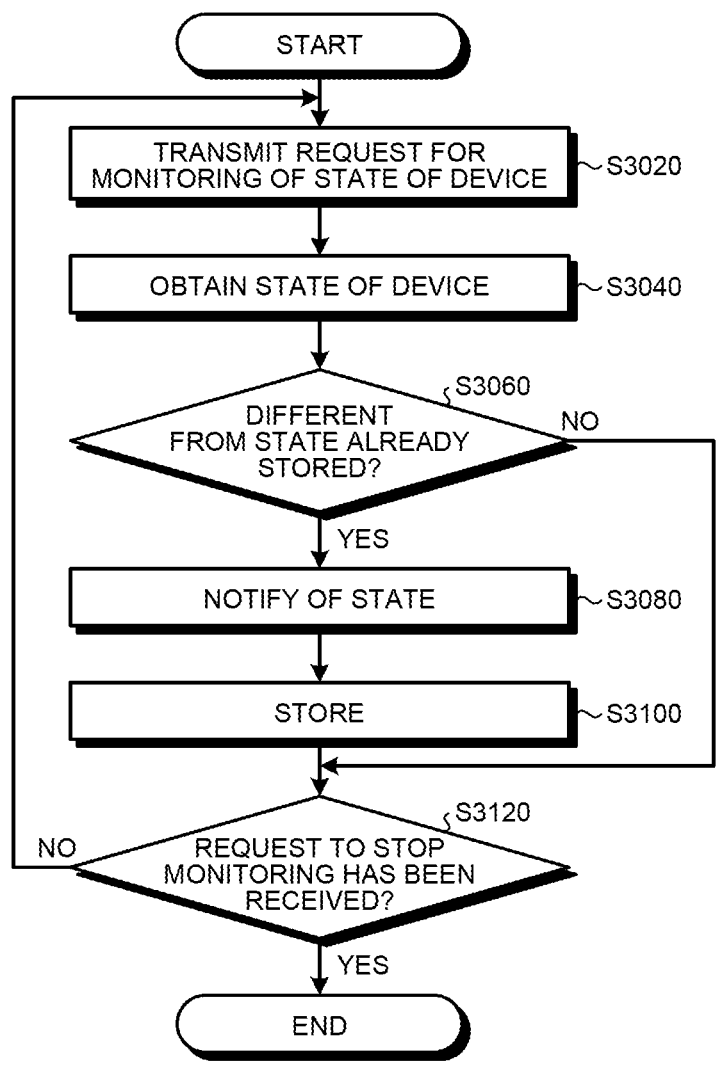
FIG. 21 is a flow chart illustrating a routine of processing of Step S2060 in FIG. 20.

Next, a routine of processing of Step S2060 in FIG. 20 will be described. FIG. 21 is a flow chart illustrating the routine of the processing of Step S2060 in FIG. 20.

First, the script executing unit 550 transmits a request for monitoring of the state of the device, to the program interface unit 420 (Step S3020).

The program interface unit 420, which has received the request for monitoring of the state of the device, obtains the state of the device from the virtual processing unit 430 and transmits the obtained state to the first browser 410. The script executing unit 550 of the first browser 410 obtains the state of the device from the program interface unit 420 (Step S3040).

The script executing unit 550 determines whether or not the state of the device stored in an internal memory is different from the state of the device obtained in Step S3040 (Step S3060).

If the state of the device stored in the internal memory coincides with the state of the device obtained in Step S3040 (Step S3060: No), the routine is advanced to Step S3120.

On the contrary, if the state of the device stored in the internal memory is different from the state of the device obtained in Step S3040 (Step S3060: Yes), the routine is advanced to Step S3080. At Step S3080, the script executing unit 550 notifies the first browser 410 of the state of the device obtained in Step S3040 (Step S3080). The script executing unit 550 stores the state of the device obtained in Step S3040 by overwriting in the internal memory (Step S3100). The routine is then advanced to Step S3120.

At Step S3120, the script executing unit 550 determines whether or not a request to stop the monitoring has been received from the first browser 410 (Step S3120). If a negative determination is made in Step S3120 (Step S3120: No), the routine is returned to above described Step S3020. On the contrary, if a positive determination is made at Step S3120 (Step S3120: Yes), this routine is ended.

The script executing unit 550 may repeatedly execute the processing of Step S3020 to Step S3100 at fixed intervals (for example, every one second, or the like) until a positive determination is made at Step S3120 (Step S3120: Yes).

Thus, the first browser 410 enables monitoring of states of the virtual processing unit 430 (that is, the device) by polling at fixed intervals.

Next, a routine of processing of Step S2120 in FIG. 20 will be described. FIG. 22 is a flow chart illustrating the routine of the processing of Step S2120 in FIG. 20.

First, the script executing unit 550 transmits a request for monitoring of the state of processing being executed in the device, to the program interface unit 420 (Step S4020).

The program interface unit 420, which has received the request for monitoring of the state of processing being executed in the device, obtains the state of the processing being executed in the device, from the virtual processing unit 430, and transmits the obtained state to the first browser 410. The script executing unit 550 obtains, on the first browser 410, the state of the processing being executed in the device, from the program interface unit 420 (Step S4040).

The script executing unit 550 then determines whether or not the state of processing being executed in the device, the state having been stored in the internal memory, is different from the state of processing being executed in the device obtained in Step S4040 (Step S4060).

If the state of processing being executed in the device, the state having been stored in the internal memory, is not different from the state of processing being executed in the device obtained in Step S4040 (Step S4060: No), the routine is advanced to Step S4120.

On the contrary, if the state of processing being executed in the device, the state having been stored in the internal memory, is different from the state of processing being executed in the device obtained in Step S4040 (Step S4060: Yes), the routine is advanced to Step S4080. At Step S4080, the script executing unit 550 notifies the first browser 410 of the state of processing being executed in the device, obtained in Step S4040 (Step S4080). The script executing unit 550 then stores the state of processing being executed in the device, obtained in Step S4040, by overwriting in the internal memory (Step S4100). The routine is then advanced to Step S4120.

At Step S4120, the script executing unit 550 determines whether or not a request to stop the monitoring has been received from the first browser 410 (Step S4120). If a negative determination is made at Step S4120 (Step S4120: No), the routine is returned to above described Step S4020. On the contrary, if a positive determination is made at Step S4120 (Step S4120: Yes), this routine is ended.

The script executing unit 550 may repeatedly execute the processing of Step S4020 to Step S4100 at fixed intervals (for example, every one second, or the like) until a positive determination is made at Step S4120 (Step S4120: Yes).

Thus, the first browser 410 enables monitoring of states of processing being executed in the virtual processing unit 430 (that is, the device) by polling at fixed intervals.

As described above, the information processing apparatus 300 of this embodiment is the information processing apparatus 300 having the first browser 410 that displays a screen on the operation display unit 340 (display unit). The information processing apparatus 300 includes the processor, the obtaining unit 510, and the receiving unit 530. The obtaining unit 510 accesses the Web application 230 installed in the server apparatus 200 (external apparatus) via the first browser 410, and obtains one or more scripts describing specific processing executed on the second browser for displaying a screen specific to the device. The script executing unit 550 functions when the processor executes the obtained one or more scripts on the first browser 410, and performs monitoring of the device and signal transmission to the device.

Conventionally, there has been a need to develop a control program by use of a browser for displaying a screen specific to a device. Therefore, it has been difficult to develop a control program for controlling a device, by use of a general purpose browser other than a browser for displaying a screen specific to the device.

In contrast, the information processing apparatus 300 according to this embodiment obtains one or more scripts describing processing specific to the second browser, and executes the one or more scripts on the first browser 410 of the information processing apparatus 300.

As described above, the information processing apparatus 300 of this embodiment is able to perform emulation of a device by executing one or more scripts on the first browser 410. In other words, the information processing apparatus 300 including the processor that executes the first browser 410, which is a general purpose browser different from the second browser, is able to be caused to function as an emulator of a device.

Therefore, with the information processing apparatus 300 of this embodiment, a control program for controlling a device is able to be developed, by use of a browser other than a browser for displaying a screen specific to the device.

Further, the one or more scripts are script programs describing specific processing executed on the second browser. Therefore, with the information processing apparatus 300, the processing specific to the second browser for displaying a screen specific to the device, such as monitoring of the device and signal transmission to the device, is able to be developed by use of the first browser 410. Therefore, in addition to the above described effects, the information processing apparatus 300 of this embodiment enables reduction of the number of manhours for development of a control program and reduction of cost of the development.

The one or more scripts include at least one of the state outputting script, the request transmitting script, the device state monitoring script, and the processing state monitoring script.

The state outputting script outputs state information of a device obtained from the device. The request transmitting script transmits a request signal to the device. The device state monitoring script monitors states of the device. The processing state monitoring script performs monitoring of states of processing being executed in the device.

Further, the information processing apparatus 300 includes the virtual processing unit 430 and the program interface unit 420. The virtual processing unit 430 executes at least operation specific to the device. The program interface unit 420 controls the virtual processing unit 430 according to a request from the first browser 410.

In this embodiment, a mode has been described, where the information processing unit 350 has a configuration including the virtual processing unit 430, and the program interface unit 420 controls the virtual processing unit 430. However, to the information processing unit 350, a device including at least one of an image generating function (printer function), a scanner function, a facsimile function, and the like may be connected to be able to transfer signals to and from the device, and the device may be controlled by the program interface unit 420.

According to the present invention, a control program operating on a browser is able to be easily made compatible with a new device having conflicting setting conditions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a memory and a processor, the memory including computer readable instructions that, when executed by the processor, configures the processor to,
  access, via a browser, a Web application installed in an external apparatus to obtain, from the external apparatus, a screen to be displayed and one or more scripts to execute, and
  when the information processing apparatus executes a processing request received, via the browser, from the Web application associated with the external apparatus, the one or more scripts are configured to,
    obtain, externally from the Web application associated with the external apparatus, setting information prescribing therein setting conditions set on the Web application, the setting conditions having setting values associated therewith that are selectable by a user for each of the setting conditions, the setting values initially having initial setting values associated therewith, obtain, internally from the memory, conflict information indicating at least a conflict, in the setting information obtained externally from the Web application, between the setting values associated with a first one of the setting conditions and the setting values associated with a second one of the setting conditions that conflict when simultaneously set during execution of the processing requested via the browser, detect the conflict between the setting values for different setting items included in the setting information obtained externally from the Web application based on the conflict information obtained internally from the memory such that the information processing apparatus detects the conflict when the information processing apparatus executes the processing request, display, via a display device, screen display information including information associated with the conflict between the setting values for different setting items included in the setting information, and requesting an input setting from the user, the input setting being associated with the conflict between the setting values for different setting items included in the setting information, and receive, from the user, the input setting, wherein the information processing apparatus is one of a plurality of information processing apparatuses each having unique conflict information internally stored in respective ones of the information processing apparatuses such that, upon execution of the one or more scripts obtained from the external apparatus, each of the plurality of information processing apparatuses is configured to, obtain the setting information from the external apparatus, and ascertain whether the setting information externally obtained from the external apparatus conflict based on the unique conflict information stored internally in the respective ones of the information processing apparatuses.

2. The information processing apparatus according to claim 1, wherein the processor is configured to detect the conflict between the setting values for different setting items included in the setting information, when the processor receives a request, from the user, to change the setting values of one of the setting conditions included in the setting information.

3. The information processing apparatus according to claim 1, wherein the processor is configured to,
display, on the display device, an indicating that one of the setting conditions included in the setting information has been set to resolve the conflict.

4. The information processing apparatus according to claim 1, wherein
the one or more scripts include plural scripts, and
the processor is configured to detect the conflict between the setting values for different setting items included in the setting information, when different ones of the plural scripts are executed by the processor on the browser.

5. The information processing apparatus according to claim 1, wherein
the processor displays, via the display device, the screen display information such that the screen display information indicates the conflict between the setting values for different setting items included in the setting information, and
the input setting received from the user indicates a resolution to the conflict.

6. The information processing apparatus according to claim 1, wherein the processor displays, via the display device, the screen display information such that the setting values included in the conflict are illustrated as being non-selectable, and
the input setting received from the user is a selectable one of the setting values.

7. The information processing apparatus according to claim 1, wherein the processor displays, via the display device, the screen display information such that the screen display information indicates that one of the setting conditions included in the setting information has been changed to resolve the conflict.

8. The information processing apparatus according to claim 7, wherein the processor is configured to,
automatically change at least one of the setting values associated with the first one of the setting conditions and the setting values associated with the second one of the setting conditions such that the conflict therebetween is resolved, and
display, via the display device, the screen display information such that the screen display information indicates that one of the setting conditions included in the setting information has been changed to resolve the conflict.

9. An information processing method executed by an information processing apparatus including a memory and a processor, the information processing method comprising:
accessing, via a browser, a Web application installed in an external apparatus to obtain, from the external apparatus, a screen to be displayed and one or more scripts to execute; and
executing the one or more scripts on the browser such that, when the information processing apparatus executes a processing request received, via the browser, from the Web application associated with the external apparatus, the one or more scripts are configured to,
obtain, externally from the Web application associated with the external apparatus, setting information prescribing therein setting conditions set on the Web application, the setting conditions having setting values associated therewith that are selectable by a user for each of the setting conditions, the setting values initially having initial setting values associated therewith,
obtain, internally from the memory, conflict information indicating at least a conflict, in the setting information obtained externally from the Web application, between the setting values associated with a first one of the setting conditions and the setting values associated with a second one of the setting conditions that conflict when simultaneously set during execution of the processing requested via the browser,
detect the conflict between the setting values for different setting items included in the setting information obtained externally from the Web application based on the conflict information obtained internally from the memory such that the information processing apparatus detects the conflict when the information processing apparatus executes the processing request, display, via a display device, a screen display information including information associated with the conflict between the setting values for different setting items included in the setting information, and requesting an input setting from the user, the input setting being associated with the conflict between the setting values for different setting items included in the setting information, and receive, from the user, the input setting, wherein the information processing apparatus is one of a plurality of information processing apparatuses each having unique conflict information internally stored in respective ones of the information processing apparatuses such that, upon execution of the one or more scripts obtained from the external apparatus, each of the plurality of information processing apparatuses is configured to, obtain the setting information from the external apparatus, and ascertain whether the setting information externally obtained from the external apparatus conflict based on the unique conflict information stored internally in the respective ones of the information processing apparatuses.

10. An information processing system comprising:

an external apparatus; and an information processing apparatus connected to the external apparatus via a network the information processing apparatus including a memory and a processor, the memory including computer readable instructions that, when executed by the processor, configures the processor to, access, via a browser, a Web application installed in the external apparatus to obtain, from the external apparatus, a screen to be displayed and one or more scripts, and execute the one or more scripts on the browser such that, when the information processing apparatus executes a processing request received, via the browser, from the Web application associated with the external apparatus, the one or more scripts are configured to, obtain, externally from the Web application associated with the external apparatus, setting information prescribing setting conditions set on the Web application, the setting conditions having setting values associated therewith that are selectable by a user for each of the setting conditions, the setting values each initially having initial setting values associated therewith;

obtain, internally from the memory, conflict information indicating at least a conflict, in the setting information obtained externally from the Web Application, between the setting values associated with a first one of the setting conditions and the setting values associated with a second one of the setting conditions that conflict when simultaneously set during execution of the processing requested via the browser;

detect the conflict between the setting values for different setting items included in the setting information obtained externally from the Web Application based on the conflict information obtained internally from the memory such that the information processing apparatus detects the conflict when the information processing apparatus executes the processing request;

display, via a display device, a screen display information including information associated with the conflict between the setting values for different setting items included in the setting information, and requesting an input setting from a user, the input setting being associated with the conflict between the setting values for different setting items included in the setting information; and receive, from the user, the input setting, wherein the information processing apparatus is one of a plurality of information processing apparatuses each having unique conflict information internally stored in respective ones of the information processing apparatuses such that, upon execution of the one or more scripts obtained from the external apparatus, each of the plurality of information processing apparatuses is configured to, obtain the setting information from the external apparatus, and ascertain whether the setting information externally obtained from the external apparatus conflict based on the unique conflict information stored internally in the respective ones of the information processing apparatuses.

* * * * *